(12) United States Patent
Saita et al.

(10) Patent No.: US 8,310,721 B2
(45) Date of Patent: Nov. 13, 2012

(54) INKJET RECORDING APPARATUS, COLOR CORRECTION METHOD AND COMPUTER-READABLE MEDIUM

(75) Inventors: Hirofumi Saita, Kanagawa-ken (JP); Yoshirou Yamazaki, Kanagawa-ken (JP)

(73) Assignee: Fujifilm Corporation, Tokyo (JP)

(*) Notice: Subject to any disclaimer, the term of this patent is extended or adjusted under 35 U.S.C. 154(b) by 530 days.

(21) Appl. No.: 12/567,232

(22) Filed: Sep. 25, 2009

(65) Prior Publication Data

US 2010/0079524 A1    Apr. 1, 2010

(30) Foreign Application Priority Data

Sep. 26, 2008  (JP) ................................. 2008-248779

(51) Int. Cl.
*B41J 29/38*   (2006.01)
*B41J 29/393*  (2006.01)
*B41J 2/17*    (2006.01)
*G06K 15/10*   (2006.01)

(52) U.S. Cl. ........... 358/1.9; 358/1.8; 358/3.26; 347/14; 347/19; 347/43; 347/96; 347/98

(58) Field of Classification Search .................. 358/1.8, 358/1.9, 3.26; 347/1, 5, 6, 7, 9, 12, 14–16, 347/19, 43, 96, 98
See application file for complete search history.

(56) References Cited

U.S. PATENT DOCUMENTS

| | | | | |
|---|---|---|---|---|
| 6,270,178 B1* | 8/2001 | Wada et al. | ........................ 347/7 |
| 6,329,108 B1* | 12/2001 | Fujiike et al. | ..................... 430/7 |
| 6,364,446 B1* | 4/2002 | Ishikawa et al. | ................. 347/15 |
| 6,652,056 B2* | 11/2003 | Shioya | ............................. 347/12 |
| 7,201,462 B2* | 4/2007 | Shibata et al. | ................... 347/19 |
| 2001/0003458 A1* | 6/2001 | Shioya | ............................. 347/19 |
| 2004/0104951 A1* | 6/2004 | Shibata et al. | ................... 347/14 |
| 2007/0109606 A1* | 5/2007 | Nagae | ........................... 358/3.26 |
| 2009/0237430 A1* | 9/2009 | Tatsumi | ............................. 347/9 |
| 2009/0244138 A1* | 10/2009 | Konno | ............................. 347/12 |
| 2011/0234659 A1* | 9/2011 | Yamamoto | ........................ 347/9 |
| 2011/0304666 A1* | 12/2011 | Takahashi et al. | .............. 347/14 |

FOREIGN PATENT DOCUMENTS

| | | |
|---|---|---|
| JP | 2004-112470 A | 4/2004 |
| JP | 2005-212246 A | 8/2005 |

* cited by examiner

*Primary Examiner* — Kimberly A Williams
(74) *Attorney, Agent, or Firm* — Birch, Stewart, Kolasch & Birch, LLP

(57) ABSTRACT

An inkjet recording apparatus includes: a treatment liquid deposition device which deposits a treatment liquid insolubilizing or aggregating inks of a plurality of colors, onto a recording medium; a recording head which has a plurality of nozzles ejecting the inks onto the recording medium on which the treatment liquid has been deposited; a data acquisition device which acquires density data of an image with respect to each color, the density data corresponding to the plurality of colors; a higher-order color correction device which corrects the density data, wherein when the inks of different colors are ejected in ejection order so that a preceding ink ejected precedingly to form a lower layer and a subsequent ink ejected subsequently to form an upper layer overlap each other, the higher-order color correction device corrects the density data for a nozzle ejecting the subsequent ink according to the density data for a nozzle ejecting the preceding ink; and an ejection controller which controls ejection of the inks from the recording head according to the density data that the higher-order color correction device has corrected in such a manner that the image is formed on the recording medium.

15 Claims, 20 Drawing Sheets

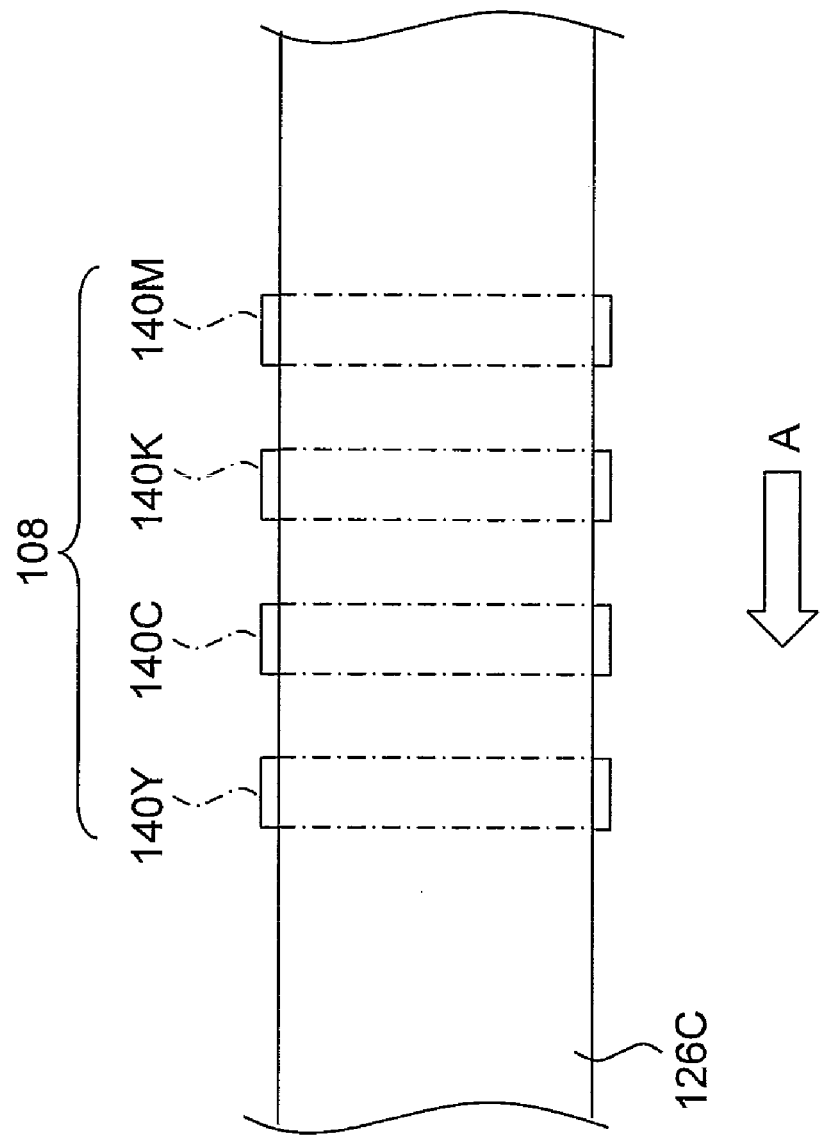

161 162 164
163

MAIN SCANNING DIRECTION

RECORDING MEDIUM CONVEYANCE DIRECTION (SUB-SCANNING DIRECTION)

161 162 164
163

MAIN SCANNING DIRECTION 161 162 164
163

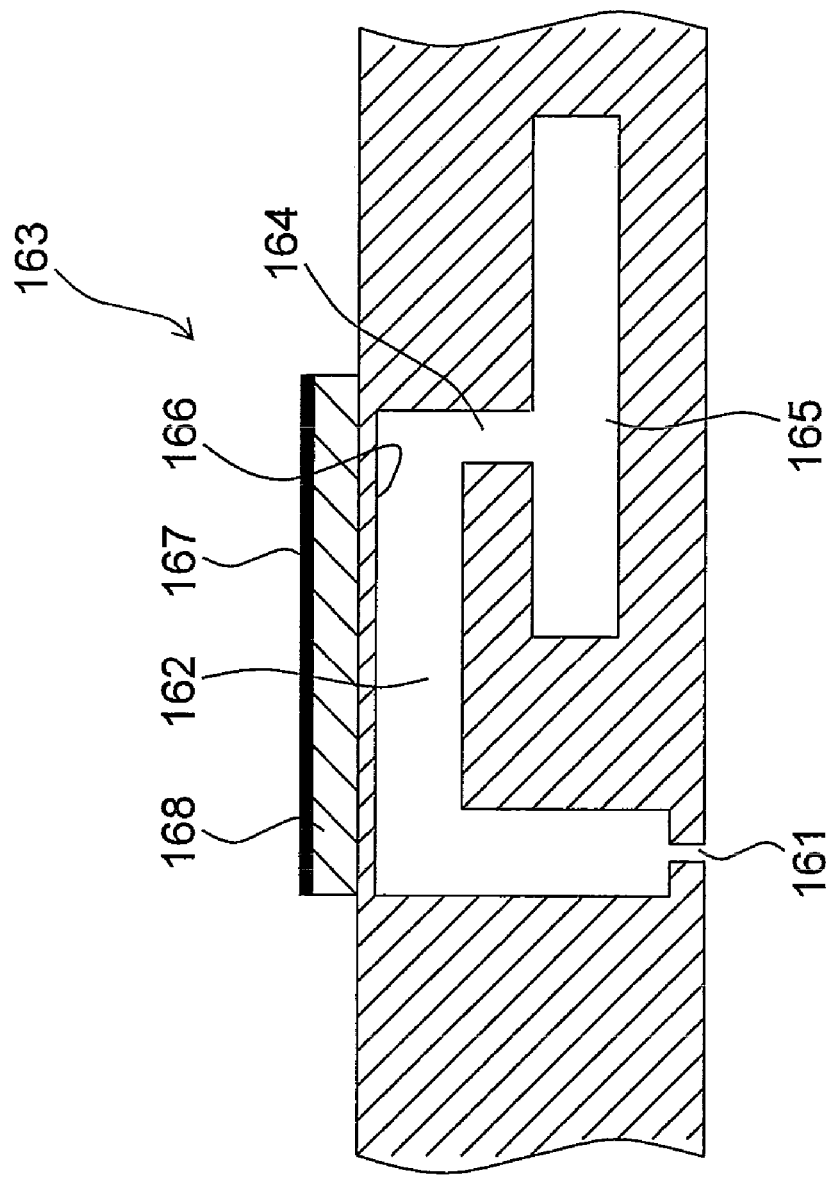

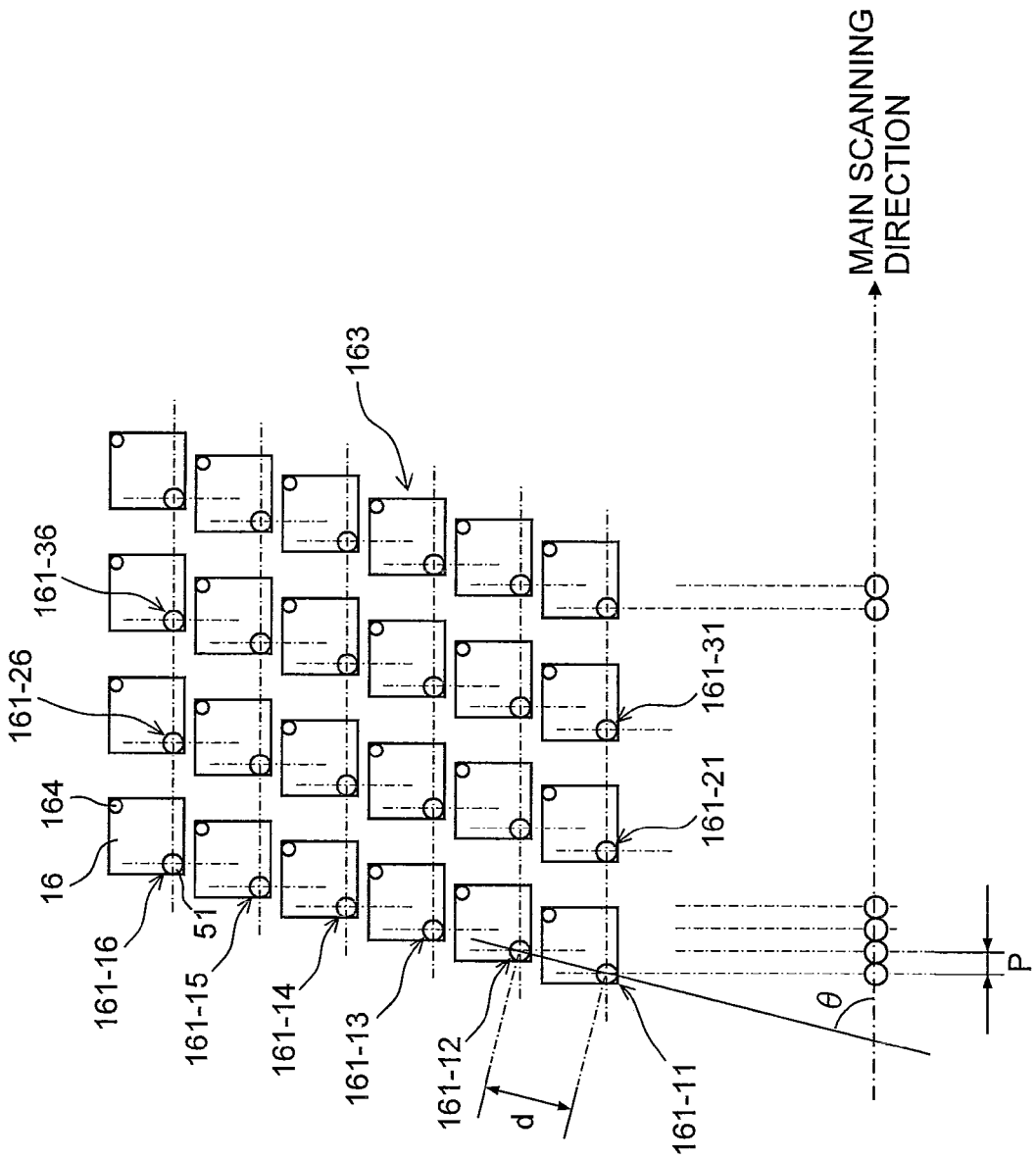

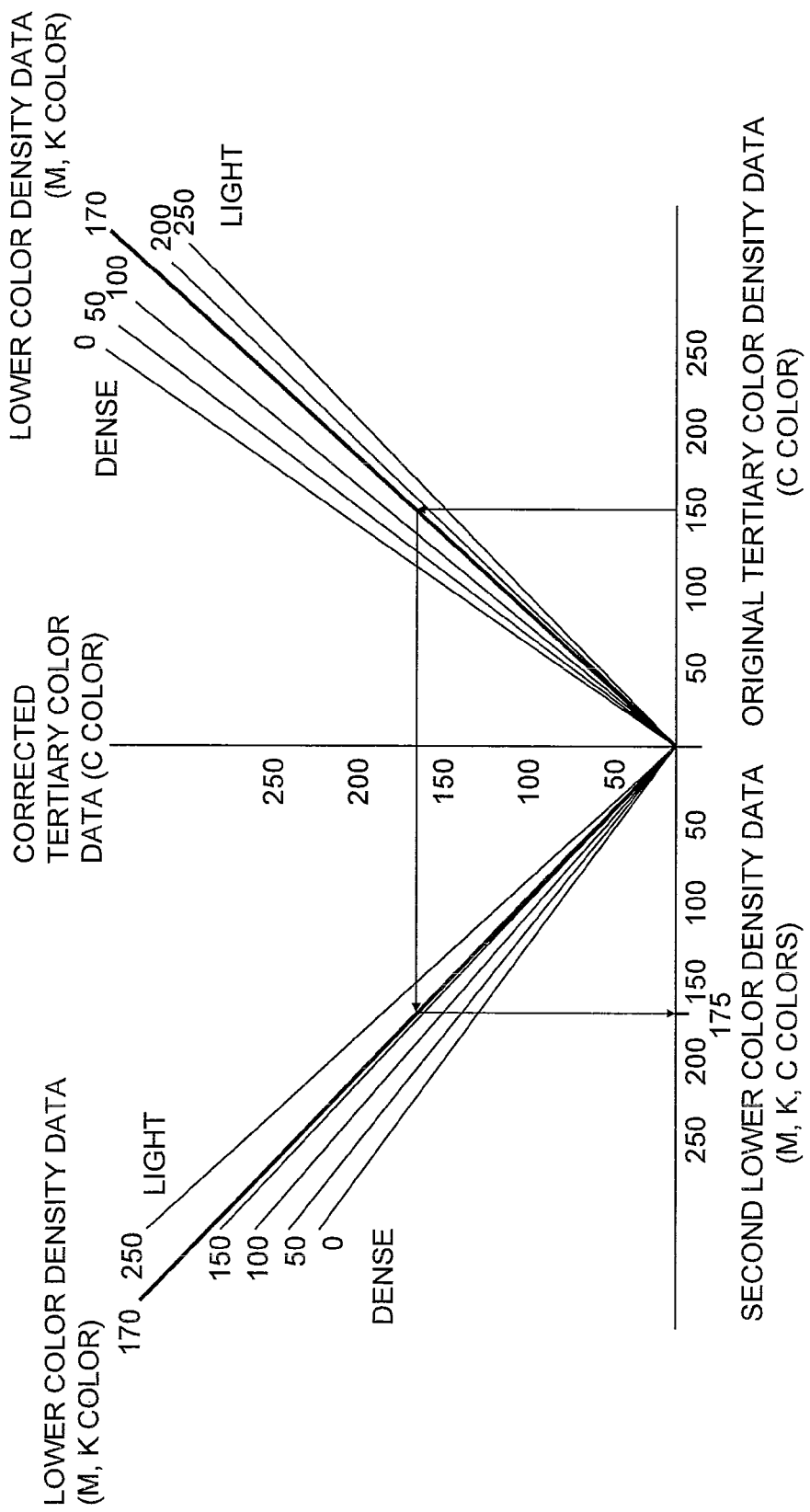

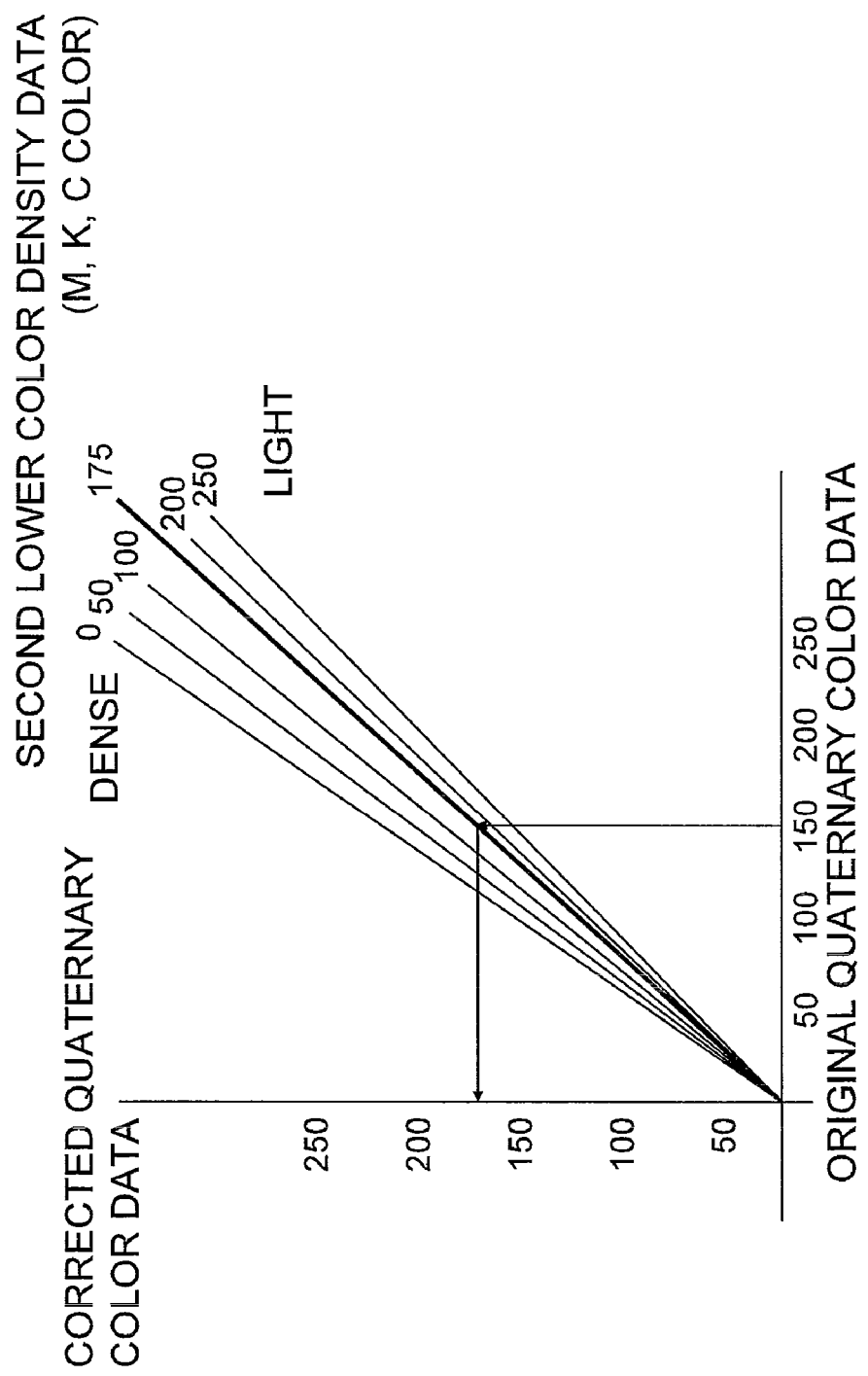

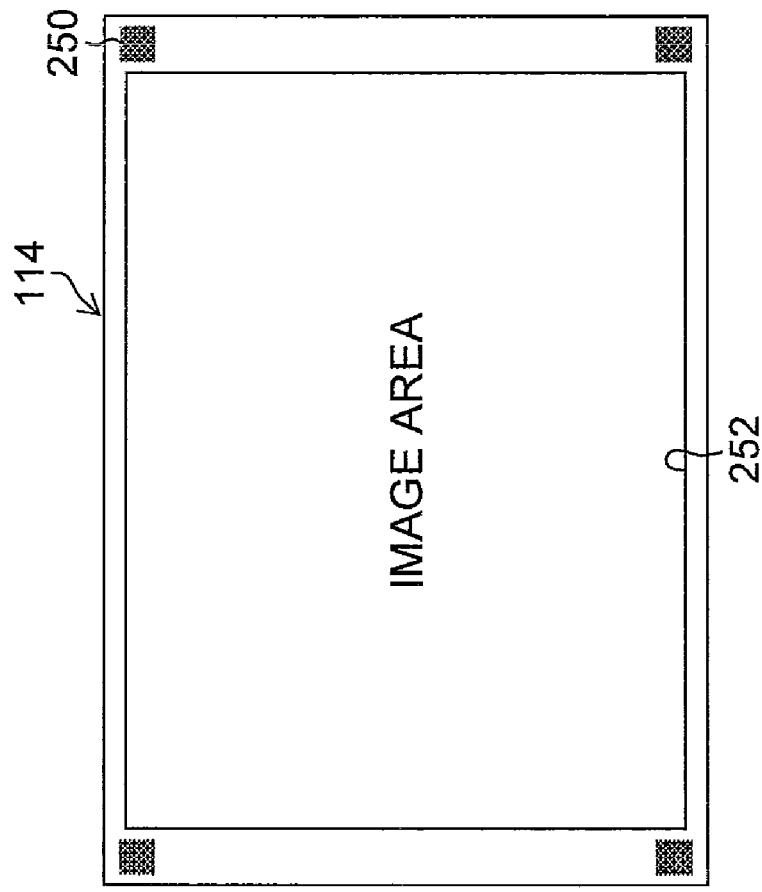

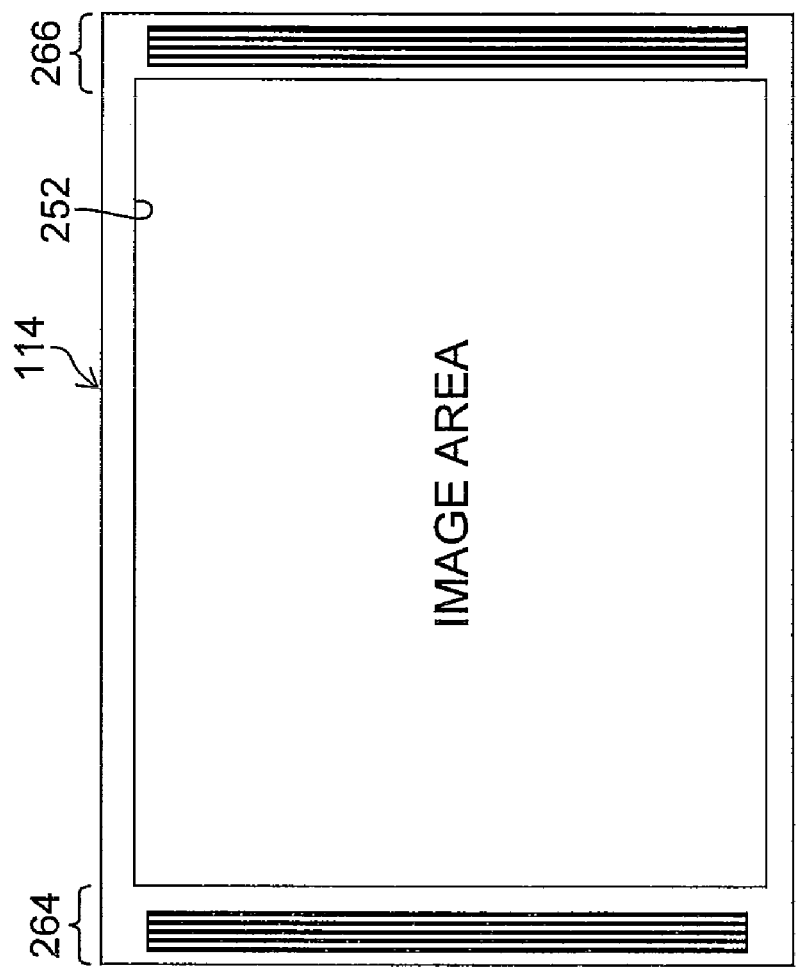

INKJET RECORDING APPARATUS, COLOR CORRECTION METHOD AND COMPUTER-READABLE MEDIUM

BACKGROUND OF THE INVENTION

1. Field of the Invention

The present invention relates to an inkjet recording apparatus, and more particularly to color correction technology that can be suitably applied to an inkjet recording apparatus forming an image by using a treatment liquid insolubilizing or aggregating coloring material of ink and a plurality of color inks.

2. Description of the Related Art

An inkjet recording apparatus that carries out color printing forms color images on a recording medium by ejecting cyan (C), magenta (M), yellow (Y), black (K), or other color inks from nozzles of a recording head, so that the ejected inks adheres to the recording medium.

Japanese Patent Application Publication No. 2004-112470 proposes a function for correcting the color displacement caused by changes in the color reproduction characteristics due to individual differences in the output device that is used in printing or in the operating environment. In this function, a predetermined standard color image is output at a predetermined number of repetitions, and by reading this color image with a sensor, calibration is automatically carried out not only for gray balance (color displacement of the primary color), but also for the higher order colors (secondary color, tertiary color) obtained by combining a plurality of ink colors.

Also, Japanese Patent Application Publication No. 2005-212246 discloses the constitution of a printing device that selects a color conversion process in accordance with environmental conditions detected by temperature and humidity sensors. The color conversion process uses a color conversion process table in accordance with the environmental conditions that affect printing (temperature, humidity), in order to reduce the variation in the printing results due to changes in the environmental conditions, such as temperature, humidity, and so on.

Also, recently, in order to solve problems such as deposition interference (merging of adjacent dots) in high speed inkjet printing, two liquid reaction technology has been proposed in which treatment liquid that aggregates the ink color material is applied or deposited prior to deposition of the ink.

However, in an image forming apparatus that forms images by inkjets on a sheet to which treatment liquid was applied, in a case where the next ink (the secondary color) is deposited after an image is formed in the first color (the primary color) by depositing the first color, the aggregation action of the treatment liquid is different from that of the first color. As a result, there is a variation in the color density created by the second color (the secondary color). Likewise for the third color (the tertiary color), and the fourth color (quaternary color), so there is an image forming problem that the effect of the treatment liquid changes for each ink color.

Examining this phenomenon, it is found that when depositing superimposed a plurality of ink dots by inkjets onto a sheet on which treatment liquid has been applied, sufficient treatment liquid is supplied for the dot deposited from a preceding nozzle. However, insufficient treatment liquid is supplied for the dots deposited from the subsequent nozzles. Therefore, the dot size of the preceding dot is made smaller by the sufficient aggregation action of the treatment liquid. However, aggregation of the subsequent dots is insufficient, so the dot sizes become larger.

When the colors of the ink ejected from the preceding nozzle and the ink ejected from the subsequent nozzle is different, for example when the ink from the preceding nozzle is magenta (M) and the ink from the subsequent nozzle is black (K), the preceding deposition (M) is sufficiently aggregated by the treatment liquid, so the dot size is always small. However, the treatment liquid is consumed by the magenta (M) which was deposited first, so the subsequently deposited black (K) has insufficient aggregation. Therefore, the dot size of the subsequently deposited black (K) is larger compared with the case that the single color black (K) only is deposited.

As described above, when the dot size varies due to differences in the aggregation effect, the color and color hue vary, so that it is difficult to obtain a desired image.

SUMMARY OF THE INVENTION

The present invention has been contrived in view of these circumstances, an object thereof being to provide an inkjet recording apparatus and a color correction method which can stabilize color reproducibility and output a high-quality image.

In order to attain an object described above, one aspect of the present invention is directed to an inkjet recording apparatus comprising: a treatment liquid deposition device which deposits a treatment liquid insolubilizing or aggregating inks of a plurality of colors, onto a recording medium; a recording head which has a plurality of nozzles ejecting the inks onto the recording medium on which the treatment liquid has been deposited; a data acquisition device which acquires density data of an image with respect to each color, the density data corresponding to the plurality of colors; a higher-order color correction device which corrects the density data, wherein when the inks of different colors are ejected in ejection order so that a preceding ink ejected precedingly to form a lower layer and a subsequent ink ejected subsequently to form an upper layer overlap each other, the higher-order color correction device corrects the density data for a nozzle ejecting the subsequent ink according to the density data for a nozzle ejecting the preceding ink; and an ejection controller which controls ejection of the inks from the recording head according to the density data that the higher-order color correction device has corrected in such a manner that the image is formed on the recording medium.

In order to attain an object described above, one aspect of the present invention is directed to a color correction method for inkjet recording that ejects inks of a plurality of colors from a plurality of nozzles of a recording head onto a recording medium on which a treatment liquid insolubilizing or aggregating the inks has been deposited so as to form a color image on the recording medium, the color correction method comprising: a data acquisition step of acquiring density data of the image with respect to each color, the density data corresponding to the plurality of colors; a higher-order color correction step of correcting the density data, wherein when the inks of different colors are ejected in ejection order so that a preceding ink ejected precedingly to form a lower layer and a subsequent ink ejected subsequently to form an upper layer overlap each other, the density data for a nozzle ejecting the subsequent ink is corrected according to the density data for a nozzle ejecting the preceding ink; and an ejection control step of controlling ejection of the inks from the recording head according to the density data that has corrected in the higher-order color correction step in such a manner that the image is formed on the recording medium.

According to the present invention, it is possible to correct the deviations of color and hue caused by the fact that the ejection density of ink ejected previously changes the effects of the treatment liquid on ink ejected subsequently, which can stabilize the color reproducibility.

BRIEF DESCRIPTION OF THE DRAWINGS

The nature of this invention, as well as other objects and benefits thereof, will be explained in the following with reference to the accompanying drawings, in which like reference characters designate the same or similar parts throughout the figures and wherein:

FIG. 2 is a principal plan diagram of the peripheral area of a print unit in the inkjet recording apparatus illustrated in FIG. 1;

FIG. 4 is a cross-sectional diagram along line 4-4 in FIGS. 3A and 3B;

FIG. 5 is an enlarged view illustrating a nozzle arrangement in the print head illustrated in FIG. 3A;

FIG. 12 is a diagram explaining a method of obtaining a second lower color density data;

FIG. 13 is a diagram explaining a method of obtaining a quaternary color density data;

FIG. 15 is a diagram illustrating an example of test pattern used for obtaining temperature information;

FIG. 20 is an explanatory diagram illustrating an example of forming a patch set on the ends (non-image portion) of a recording medium.

DETAILED DESCRIPTION OF THE PREFERRED EMBODIMENTS

Structure of Inkjet Recording Apparatus

Figure 1:
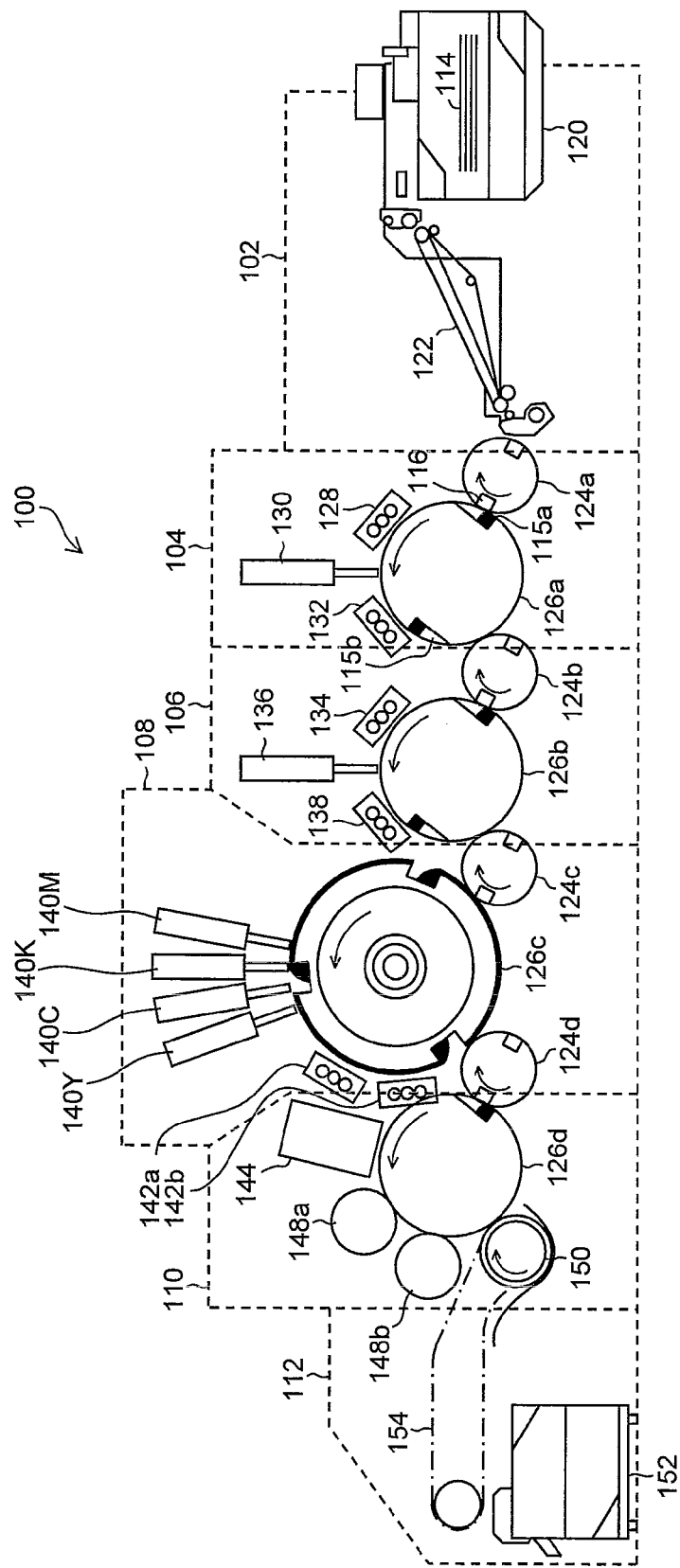
FIG. 1 is a general schematic drawing of an inkjet recording apparatus relating to an embodiment of the present invention.

FIG. 1 is a general schematic drawing of the overall composition of an inkjet recording apparatus 100 relating to an embodiment of the present invention. The inkjet recording apparatus 100 illustrated in FIG. 1 is an on demand type image recording apparatus that records desired color images on one side of a sheet (recording medium) 114 by depositing inks of CMYK colors. The inkjet recording apparatus 100 is a recording apparatus that uses the 2 liquid aggregation system that forms images on a recording medium 114 that comprises square paper sheets, using ink and treatment liquid (aggregation treatment liquid). In the present embodiment, Tokubishi art paper (art paper) manufactured by Mitsubishi Paper Mills Limited is used as the recording medium 114, but the present embodiment is not particularly limited to this, and various types of media can be used.

This inkjet recording apparatus 100 principally comprises: a paper supply unit 102 which supplies a recording medium 114; a permeation suppression processing unit 104 which carries out permeation suppression processing on the recording medium 114; a treatment agent deposition unit 106 which deposits treatment agent onto the recording medium 114; an ink ejection unit 108 which forms an image by depositing colored ink onto the recording medium 114; a fixing treatment unit 110 which carries out a fixing process so that an image recorded on the recording medium 114 is fixed; and a paper output unit 112 which conveys and outputs the recording medium 114 on which an image has been formed.

A paper supply platform 120 on which recording media 114 is stacked is provided in the paper supply unit 102. A feeder board 122 is connected to the front of the paper supply platform 120 (the left-hand side in FIG. 1), and the recording media 114 stacked on the paper supply platform 120 is supplied one sheet at a time, successively from the uppermost sheet, to the feeder board 122. A recording medium 114 which has been conveyed to the feeder board 122 is supplied via a transfer drum 124a, which is rotatable in the clockwise direction in FIG. 1, to the surface (circumferential surface) of a pressure drum 126a of the permeation suppression processing unit 104.

Grippers (not illustrated) for holding an edge of a recording medium 114 are provided on the transfer drum 124a and pressure drum 126a. When an edge of a recording medium held by a gripper of the transfer drum 124a reaches a place where the recording medium 114 is transferred between the transfer drum 124a and the pressure drum 126a, the edge of the recording medium is transferred from the gripper of the transfer drum 124a to a gripper of the pressure drum 126a. In the present example, two grippers are provided on one pressure drum 126, and one gripper is provided on one transfer drum 124.

Permeation Suppression Processing Unit

The permeation suppression processing unit 104 applies permeation suppression agent that suppresses permeation of water and hydrophilic organic solvent contained in the treatment liquid and ink into the recording medium 114. The permeation suppression agent is resin dispersed as an emulsion in a solvent, or a resin dissolved in the solvent. Organic solvent or water is used as the solvent. Methyl ethyl ketone, petroleum, or the like may be desirably used as appropriate as the organic solvent. The temperature $T_1$ of the recording sheet is higher than the lowest film formation temperature $T_{f1}$ of the resin. The difference between $T_1$ and $T_{f1}$ is desirably 10 to 20° C. In this way, a good film is formed immediately after the resin adheres to the recording medium 114, and it is possible to suppress well the permeation into the recording medium 114 of solvents of the inks and treatment liquid which are subsequently applied to the recording medium 114. Adjustment of the temperature of the recording medium 114 may be carried out by the method of providing a heating element such as a heater or the like within the pressure drum 126a, or the method of applying hot air to the surface (top surface) of the recording medium 114, or heating using an infrared heater or the like, or a combination of these.

If the recording medium 114 does not easily curl, the permeation suppression processing unit 104 may be omitted. For example, the quantity of permeation suppression agent applied (including the case where permeation suppression agent is not applied) may be controlled in accordance with the type of recording medium 114.

In the permeation suppression processing unit 104, a paper preheating unit 128, a permeation suppression agent head 130 and a permeation suppression agent drying unit 132 are provided respectively at positions opposing the surface (circumferential surface) of the pressure drum 126a, in this order from the upstream side in terms of the direction of rotation of the pressure drum 126a (the conveyance direction of the recording medium 114; the counter-clockwise direction in FIG. 1).

Heaters which can be temperature-controlled respectively within a prescribed range are provided in the paper preheating unit 128 and the permeation suppression agent drying unit 132. When the recording medium 114 held on the pressure drum 126a passes the positions opposing the paper preheating unit 128 and the permeation suppression agent drying unit 132, it is heated by the heaters of these units.

The permeation suppression agent head 130 ejects droplets of a permeation suppression agent onto a recording medium 114 which is held on the pressure drum 126a and adopts the same composition as the ink heads 140M, 140K, 140C, 140Y of the ink ejection unit 108, which is described below.

In the present embodiment, an inkjet head is used as the device for carrying out permeation suppression processing on the surface of the recording medium 114, but there are no particular restrictions of the device which carries out permeation suppression processing. For example, it is also possible to use various other methods, such as a spray method, application method, and the like.

In the present embodiment, it is desirable to use a thermoplastic resin latex solution as the permeation suppression agent. Of course, the permeation suppression agent is not limited to being a thermoplastic resin latex solution, and for example, it is also possible to use a flat sheet-shaped particles (mica, or the like), or a hydrophobic agent (a fluorine coating agent), or the like.

Treatment Liquid Deposition Unit

A treatment liquid deposition unit 106 is provided after the permeation suppression processing unit 104 (to the downstream side of same in terms of the direction of conveyance of the recording medium 114). A transfer drum 124b is provided between the pressure drum 126a of the permeation suppression processing unit 104 and the pressure drum 126b of the treatment liquid deposition unit 106, so as to make contact with same. By adopting this structure, after the recording medium 114 which is held on the pressure drum 126a of the permeation suppression processing unit 104 has been subjected to permeation suppression processing, the recording medium 114 is transferred via the transfer drum 124b, which is rotatable in the clockwise direction in FIG. 1, to the pressure drum 126b of the treatment liquid deposition unit 106.

In the treatment liquid deposition unit 106, a paper preheating unit 134, a treatment liquid head 136 and a treatment liquid drying unit 138 are provided respectively at positions opposing the surface of the pressure drum 126b, in this order from the upstream side in terms of the direction of rotation of the pressure drum 126b (the counter-clockwise direction in FIG. 1).

The respective units of the treatment liquid deposition unit 106 (namely, the paper preheating unit 134, the treatment liquid head 136 and the treatment liquid drying unit 138) use similar compositions to the paper preheating unit 128, the permeation suppression agent head 130 and the permeation suppression agent drying unit 132 of the permeation suppression processing unit 104 which is described above, and the explanation of those units is omitted here. Of course, it is also possible to employ different compositions from the permeation suppression processing unit 104.

The treatment liquid used in the present embodiment is an acidic liquid which has the action of aggregating the coloring material contained in the inks which are ejected onto the recording medium 114 from respective ink heads 140M, 140K, 140C, 140Y provided in the ink ejection unit 108 which is disposed at a downstream stage from the treatment liquid deposition unit 106.

The heating temperature of the heater of the treatment liquid drying unit 138 is set to a temperature at which the treatment liquid which has been deposited onto the surface of the recording medium 114 by the ejection operation of the treatment liquid head 136 disposed to the upstream side in terms of the direction of rotation of the pressure drum 126b is dried, and a solid or semi-solid aggregating treatment agent layer (a thin film layer of dried treatment liquid) is formed on the recording medium 114.

Reference here to "aggregating treatment agent layer in a solid state or a semi-solid state" includes a layer having a liquid content of 0% to 70% as defined below.

$$\text{"Moisture content ratio"} = \text{"Weight per unit surface area of water contained in treatment liquid after drying } (g/m^2)\text{"}/\text{"Weight per unit surface area of treatment liquid after drying } (g/m^2)\text{"} \quad \text{Expression 1}$$

Also, "aggregating treatment agent" refers not only to a solid or semi-solid substance, but in addition is used in the broader concept to include a liquid substance. In particular, liquid aggregating treatment agent that includes 70% or more solvent (content rate of solvent) is referred to as "aggregating treatment liquid".

The method of calculating the solvent content of the aggregating treatment agent is to cut out a specific size of sheet (for example 100 mm×100 mm), and to measure the total weight after applying treatment liquid (sheet+treatment liquid before drying) and the total weight after drying the treatment liquid (sheet+treatment liquid after drying). From the difference of these measurements, the amount of reduction in solvent due to drying (quantity of solvent evaporated) is obtained. Also, the calculated quantity obtained from the method of adjusting the treatment liquid may be used as the quantity of solvent contained in the treatment liquid before drying. From these calculation results, the solvent content can be obtained.

Here, Table 1 indicates the results of evaluation of the movement of color material when the solvent content rate of the treatment liquid (aggregation treatment agent layer) on the recording medium 114 is changed.

TABLE 1

|  | Experiment 1 | Experiment 2 | Experiment 3 | Experiment 4 | Experiment 5 |
|---|---|---|---|---|---|
| Drying process | Not exist | Exist | Exist | Exist | Exist |
| Total weight (g/m$^2$) | 10.0 | 6.0 | 4.0 | 3.0 | 1.3 |
| Weight of water (g/m$^2$) | 8.7 | 4.7 | 2.7 | 1.5 | 0 |
| Content rate of solvent | 87% | 78% | 67% | 50% | 0% |
| Movement of color material | Poor (Failure) | Average (Dot moves slightly) | Good (Inconspicuous though dot moves) | Excellent | Excellent |

As illustrated in Table 1, if the treatment liquid was not dried (Experiment 1), image degradation due to movement of color material occurred.

In contrast, in cases where the treatment liquid was dried (Experiments 2 to 5), when the treatment liquid was dried until the solvent content in the treatment liquid became 70% or less, movement of color material was not conspicuous. Further, when the treatment liquid was dried until the solvent content in the treatment liquid became 50% or less, the level was so good that movement of color material could not be detected visually. Therefore it has been confirmed that this is effective in preventing image degradation.

In this way, by drying the treatment liquid on the recording medium 114 to a solvent content of 70% or less (desirably 50% or less) so that a solid or semi-solid layer of aggregation treatment agent is formed on the recording medium 114, it is possible to prevent image degradation due to movement of color material.

A desirable mode is one in which the recording medium 114 is preheated by the heater of the paper preheating unit 134, before depositing treatment liquid on the recording medium 114, as in the present embodiment. In this case, it is possible to restrict the heating energy required to dry the treatment liquid to a low level, and therefore energy savings can be made.

An ink ejection unit 108 is provided after the treatment liquid deposition unit 106. A transfer drum 124c, which is composed rotatably in the clockwise direction in FIG. 1, is provided between the pressure drum 126b of the treatment liquid deposition unit 106 and the pressure drum 126c of the ink ejection unit 108, so as to make contact with same. By means of this structure, treatment liquid is deposited onto the recording medium 114 held on the pressure drum 126b of the treatment liquid deposition unit 106, thereby forming a solid or semi-solid layer of aggregating treatment agent, whereupon the recording medium 114 is transferred via the transfer drum 124c to the pressure drum 126c of the ink ejection unit 108.

In the ink ejection unit 108, ink heads 140M, 140K, 140C, 140Y which correspond respectively to four colors of ink, M (magenta), K (black), C (cyan) and Y (yellow), and solution drying units 142a and 142b are provided respectively at positions opposing the surface of the pressure drum 126c, in this order from the upstream side in terms of the direction of rotation of the pressure drum 126c (the counter-clockwise direction in FIG. 1).

The ink heads 140M, 140K, 140C, 140Y employ inkjet type recording heads (inkjet heads), similarly to the permeation suppression agent head 130 and the treatment liquid head 136. In other words, the ink heads 140M, 140K, 140C, 140Y respectively eject droplets of corresponding colored inks onto a recording medium 114 which is held on the pressure drum 126c.

The ink heads 140M, 140K, 140C, 140Y are each full-line heads having a length corresponding to the maximum width of the image forming region of the recording medium 114 held on the pressure drum 126c, and having a plurality of nozzles for ejecting ink (not illustrated in FIG. 1 and indicated by reference numeral 161 in FIGS. 13A to 13C) arranged through the full width of the image forming region, on the ink ejection surface of the head. The ink heads 140M, 140K, 140C, 140Y are fixed so as to extend in a direction that is perpendicular to the direction of rotation of the pressure drum 126c (the conveyance direction of the recording medium 114) (see FIG. 2).

According to a composition in which such full line heads having nozzle rows which cover the full width of the image forming region of the recording medium 114 are provided for each color of ink, it is possible to record a primary image on the image forming region of the recording medium 114 by performing just one operation of moving the recording medium 114 and the ink heads 140M, 140K, 140C, 140Y relatively with respect to each other (in other words, by one sub-scanning action). Therefore, it is possible to achieve a higher printing speed compared to a case which uses a serial (shuttle) type of head which moves back and forth reciprocally in the direction perpendicular to the conveyance direction of the recording medium 114 (sub-scanning direction), and hence it is possible to improve the print productivity.

Although the configuration with the CMYK four colors is described in the present embodiment, combinations of the ink colors and the number of colors are not limited to those. Light inks, dark inks or special color inks can be added or removed as required. For example, a configuration in which ink heads for ejecting light-colored inks such as light cyan and light magenta are added, or a configuration using the CMYK four colors is possible. Furthermore, there are no particular restrictions of the sequence in which the heads of respective colors are arranged.

The solution drying units 142a and 142b have a composition which comprises heater whose temperature can be controlled within a prescribed range, similarly to the paper preheating units 128 and 134, the permeation suppression agent drying unit 132, and the treatment liquid drying unit 138, which are described above. As described hereinafter, if ink droplets are ejected onto the layer of aggregating treatment agent in a solid state or semi-solid state which has been formed on the recording medium 114, an ink aggregate (coloring material aggregate) is formed on the recording medium 114, and furthermore, the ink solvent which has separated from the coloring material spreads and a liquid layer of dissolved aggregating treatment agent is formed. The solvent component (liquid component) left on the recording medium 114 in this way is a cause of curling of the recording medium 114 and also leads to deterioration of the image. Therefore, in the present embodiment, after ejecting droplets of the corresponding colored inks onto the recording medium 114 respectively from the ink heads 140M, 140K, 140C, 140Y, heating is carried out by the heaters of the solution drying units 142a and 142b, and the solvent component is evaporated off and dried.

Fixing Processing Unit

The fixing processing unit 110 is provided subsequent to the ink ejection unit 108, and a transfer drum 124d is provided between the pressure drum 126c of the ink ejection unit 108 and the pressure drum 126d of the fixing processing unit 110 so as to make contact with the pressure drums. By this means, after the respective colored inks have been deposited on the recording medium 114 which is held on the pressure drum 126c of the ink ejection unit 108, the recording medium 114 is transferred via the transfer drum 124d to the pressure drum 126d of the fixing processing unit 110.

In the fixing processing unit 110, an in-line sensor 144 which reads in the print results of the ink ejection unit 108, and heating rollers 148a and 148b are provided respectively at positions opposing the surface of the pressure drum 126d, in this order from the upstream side in terms of the direction of rotation of the pressure drum 126d (the counter-clockwise direction in FIG. 1). In the present embodiment, a mode based on application of heat and pressure is described as one example of a fixing device after image recording, but it is also possible to adopt other compositions, such as a composition in which a transparent ultraviolet-curable ink droplet ejection unit ejects droplets of transparent ultraviolet-curable ink, and the transparent ultraviolet-curable ink is cured and the image is thereby fixed onto the recording medium 114 by irradiating ultraviolet light thereon.

The in-line sensor 144 is a device for reading an output image, and includes an image sensor (a line sensor, or the like) which captures the print result of the ink ejection unit 108 (the droplet ejection results of the respective ink heads 140M, 140K, 140C, 140Y). The in-line sensor 144 functions as a device for checking for nozzle blockages and other ejection defects on the basis of the droplet ejection image read out by the image sensor, and functions as a colorimetrical device for acquiring color information.

In the present example, a test pattern is formed on the image recording region or the non-image portion of the recording medium 114 (see FIG. 8), the test pattern is read in by the in-line sensor 144, and in-line determination is carried out so as to acquire the color information (colorimetry), determine the density variability and determine the presence or absence of ejection abnormalities in the respective nozzles, on the basis of the reading results.

The in-line sensor (ILS) 144 employed in the present example comprises a line CCD in which a plurality of inspection pixels (photoelectric conversion element) are arranged in one row or a plurality of rows in the breadthways direction of the recording medium 114 (or an area sensor in which a plurality of inspection pixels are arranged in a two-dimensional configuration), and a lens (reducing grass) disposed in such a manner that the line CCD (or area sensor) can read in the whole of the breadthways direction of the recording medium 114 at the same time. Instead of the above line sensor having a determination range which can read the data in terms of the recordable width at the same time, it is possible to use a sensor having a readable range narrower than the above line sensor. In such a mode, the data reading can be carried out while moving (scanning) the reading position.

Paper Output Unit

The paper output unit 112 is provided subsequent to the fixing processing unit 110. In the paper output unit 112, there are provided: a paper output drum 150 which receives a recording medium 114 subjected to fixing processing, a paper output platform 152 on which recording media 114 is stacked, and a paper output chain 154 comprising a plurality of paper output grippers, which are spanned between a sprocket provided on the paper output drum 150 and a sprocket provided above the paper output platform 152.

Structural Example of Head

Next, the structure of the ink heads 140M, 140K, 140C, 140Y disposed in the ink ejection unit 108 will be described in detail. The ink heads 140M, 140K, 140C, 140Y have a common structure, and therefore, below, these heads are represented by an ink head (hereinafter, simply called a "head") which is indicated by reference numeral 160.

Figure 3A:
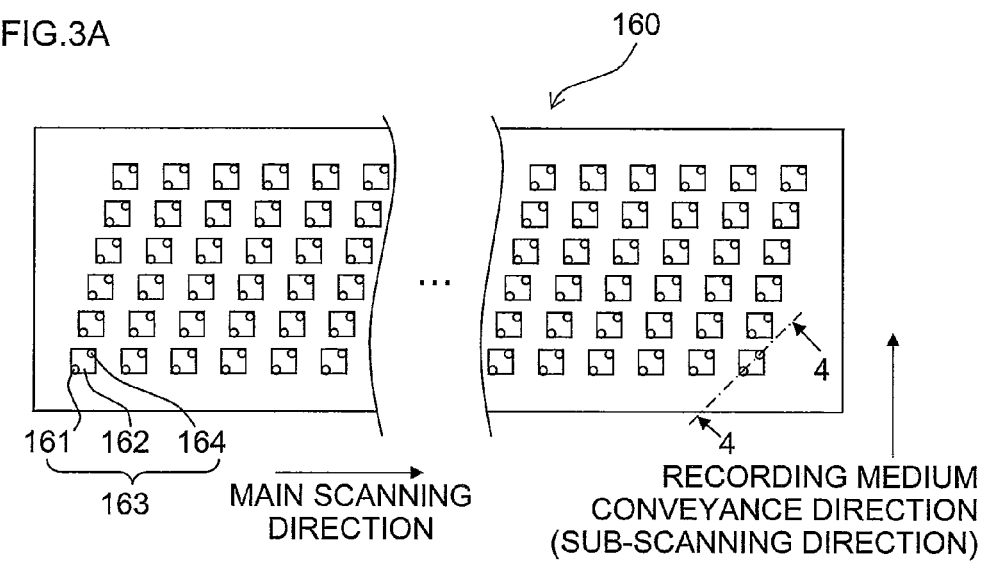
FIGS. 3A to 3C are plan view perspective diagrams illustrating examples of the head illustrated in FIG. 1.
Figure 3B:
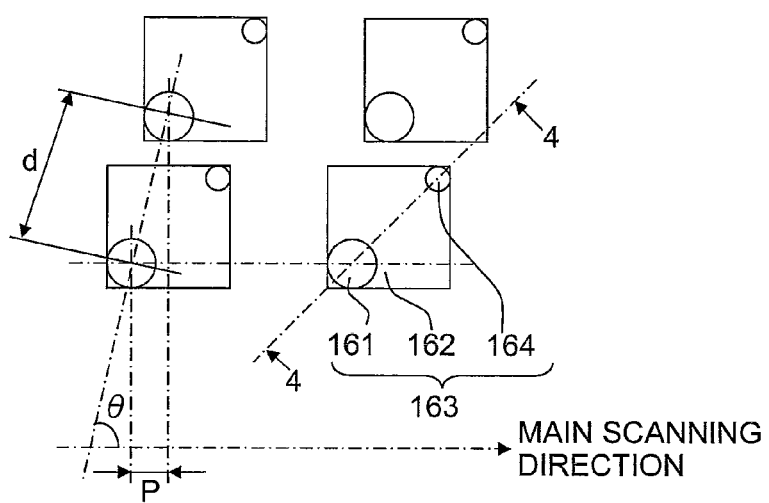
Figure 3C:
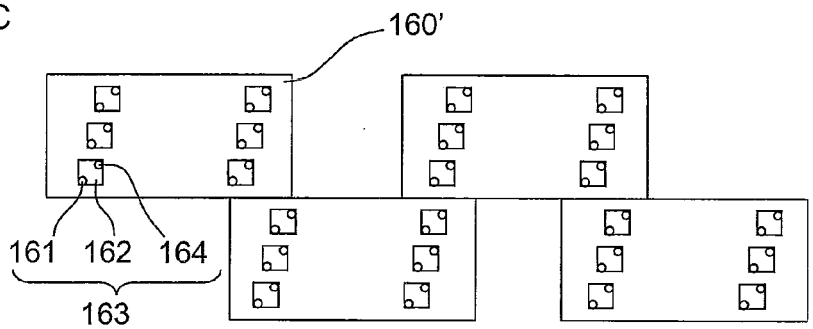

FIG. 3A is a perspective plan view illustrating an example of the configuration of a head 160, FIG. 3B is an enlarged view of a portion thereof. FIG. 3C is a perspective plan view illustrating another example of the configuration of the head 160. FIG. 4 is a cross-sectional view taken along the line 4-4 in FIGS. 3A and 3B, illustrating the cross sectional view structure of a liquid ejection element for one channel forming a recording element unit (an ink chamber unit corresponding to one nozzle 161).

The nozzle pitch in the head 160 should be minimized in order to maximize the density of the dots formed on the surface of the recording medium 114. As illustrated in FIGS. 3A and 3B, the head 160 according to the present embodiment has a structure in which a plurality of ink chamber units 163, each comprising a nozzle 161 forming an ink droplet ejection port, a pressure chamber 162 corresponding to the nozzle 161, and the like, are disposed two-dimensionally in the form of a staggered matrix, and hence the effective nozzle interval (the projected nozzle pitch) as projected in the lengthwise direction of the head (the main-scanning direction perpendicular to the recording medium conveyance direction) is reduced and high nozzle density is achieved.

The mode of forming one or more nozzle rows through a length corresponding to the entire width of the recording medium 114 in a direction substantially perpendicular to the conveyance direction of the recording medium 114 is not limited to the example described above. For example, instead of the configuration in FIG. 3A, as illustrated in FIG. 3C, a line head having nozzle rows of a length corresponding to the entire width of the recording medium 114 can be formed by arranging and combining, in a staggered matrix, short head blocks 160' having a plurality of nozzles 161 arrayed in a two-dimensional fashion. Furthermore, although not illustrated in the drawings, it is also possible to compose a line head by arranging short heads in one row.

The planar shape of the pressure chamber 162 provided for each nozzle 161 is substantially a square, and the nozzle 161 and supply port 164 are disposed in both corners on a diagonal line of the square. Each pressure chamber 162 is connected to a common channel 165 through the supply port 164. The common channel 165 is connected to an ink supplied tank (not illustrated), which is a base tank that supplies ink, and the ink supplied from the ink supplied tank is delivered through the common flow channel 165 to the pressure chambers 162.

A piezoelectric element 168 provided with an individual electrode 167 is bonded to a pressure plate 166 (a diaphragm that also serves as a common electrode) which forms a portion of the surfaces of each pressure chamber 162 (in FIG. 4, the ceiling thereof). When a drive voltage is applied to the individual electrode 167, the piezoelectric element 168 is deformed and the ink is thereby ejected through the nozzle 161. When ink is ejected, new ink is supplied to the pressure chamber 162 from the common flow channel 165 through the supply port 164.

In the present example, a piezoelectric element 168 is used as an ink ejection force generating device which causes ink to be ejected from a nozzle 160 provided in a head 161, but it is also possible to employ a thermal method in which a heater is provided inside each pressure chamber 162 and ink is ejected by using the pressure of the film boiling action caused by the heating action of this heater.

As illustrated in FIG. 5, the high-density nozzle head according to the present embodiment is achieved by arranging a plurality of ink chamber units 163 having the above-described structure in a lattice fashion based on a fixed arrangement pattern, in a row direction which coincides with the main scanning direction, and a column direction which is inclined at a fixed angle of θ with respect to the main scanning direction, rather than being perpendicular to the main scanning direction.

More specifically, by adopting a structure in which a plurality of ink chamber units 163 are arranged at a uniform pitch d in line with a direction forming an angle of θ with respect to the main scanning direction, the pitch P of the nozzles projected so as to align in the main scanning direction is d×cos θ, and hence the nozzles 161 can be regarded to be equivalent to those arranged linearly at a fixed pitch P along the main scanning direction.

In a full-line head comprising rows of nozzles that have a length corresponding to the entire width of the image recordable width, the "main scanning" is defined as printing one line (a line formed of a row of dots, or a line formed of a plurality of rows of dots) in the width direction of the recording medium 114 (the direction perpendicular to the conveyance direction of the recording medium 114) by driving the nozzles in one of the following ways: (1) simultaneously driving all the nozzles; (2) sequentially driving the nozzles from one side toward the other; and (3) dividing the nozzles into blocks and sequentially driving the nozzles from one side toward the other in each of the blocks.

In particular, when the nozzles 161 arranged in a matrix such as that illustrated in FIGS. 3A and 3B are driven, the main scanning according to the above-described (3) is preferred. More specifically, the nozzles 161-11, 161-12, 161-13, 161-14, 161-15 and 161-16 are treated as a block (additionally; the nozzles 161-21, 161-22, . . . , 161-26 are treated as another block; the nozzles 161-31, 161-32, . . . , 161-36 are treated as another block; . . . ); and one line is printed in the width direction of the recording medium 114 by sequentially driving the nozzles 161-11, 161-12, . . . , 161-16 in accordance with the conveyance velocity of the recording medium 114.

On the other hand, "sub-scanning" is defined as to repeatedly perform printing of one line (a line formed of a row of dots, or a line formed of a plurality of rows of dots) formed by the main scanning, while moving the full-line head and the recording medium 114 relatively to each other.

The direction indicated by one line (or the lengthwise direction of the band-shaped region thus recorded) recorded by the main scanning action is called the "main scanning direction", and the direction in which sub-scanning is performed is called the sub-scanning direction. Consequently, the conveyance direction of the recording medium 114 is the sub-scanning direction and the width direction of the recording medium 114 being perpendicular to the sub-scanning direction is called the main scanning direction. The arrangement of the nozzles of embodiments of the present invention is not limited to the arrangements illustrated in the drawings. Various nozzle arrangements, such as an arrangement of one nozzle row in the sub-scanning direction for example, can be employed.

Furthermore, the scope of application of the present invention is not limited to a printing system based on a line type of head, and it is also possible to adopt a serial system where a short head which is shorter than the breadthways dimension of the recording medium 114 is scanned (moved) in the breadthways direction (main scanning direction) of the recording medium 114, thereby performing printing in the breadthways direction, and when one printing action in the breadthways direction has been completed, the recording medium 114 is moved through a prescribed amount in the direction perpendicular to the breadthways direction (the sub-scanning direction), printing in the breadthways direction of the recording medium 114 is carried out in the next printing region, and by repeating this sequence, printing is performed over the whole surface of the printing region of the recording medium 114.

Figure 6:
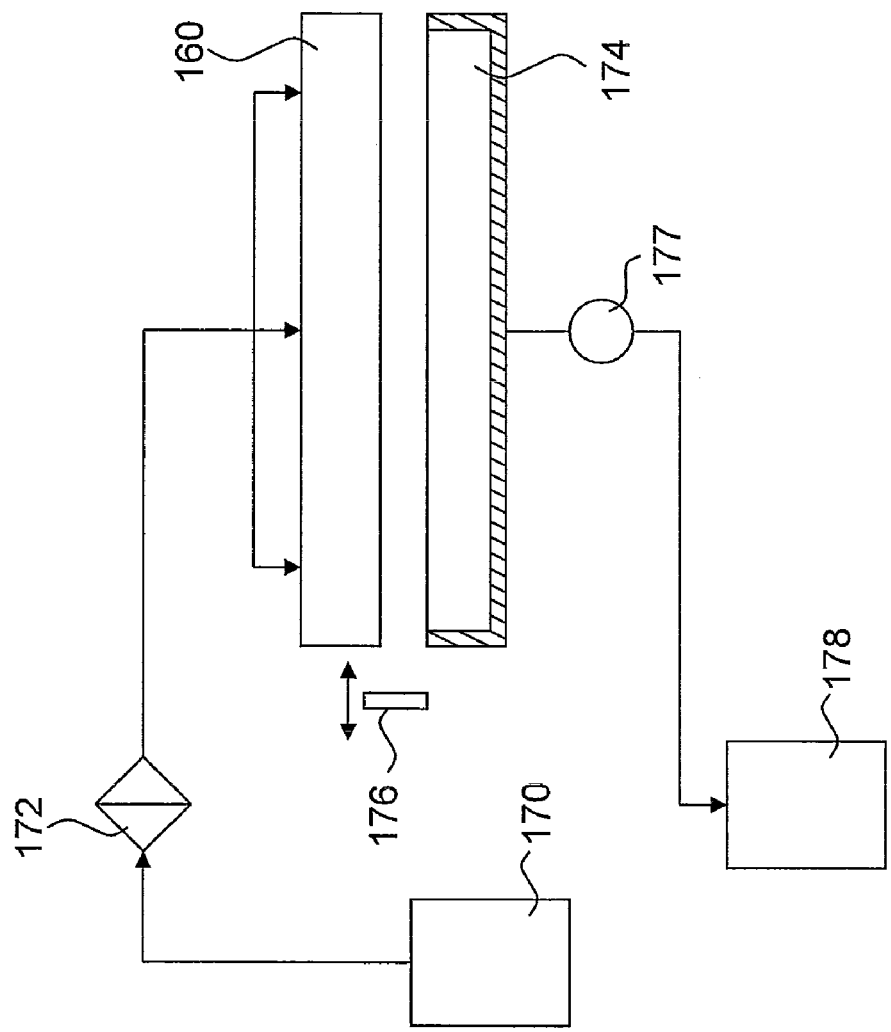
FIG. 6 is a schematic drawing illustrating the composition of an ink supply system.

FIG. 6 is a schematic drawing illustrating the configuration of the ink supply system in the inkjet recording apparatus 100. The ink supply tank 170 is a base tank to supply ink to the print head 160 and is included in the ink storing and loading unit described above. The aspects of the ink supply tank 170 include a refillable type and a cartridge type: when the remaining amount of ink is low, the ink tank of the refillable type is filled with ink through a filling port (not illustrated) and the ink tank of the cartridge type is replaced with a new one. In order to change the ink type in accordance with the intended application, the cartridge type is suitable, and it is desirable to represent the ink type information with a bar code or the like, and to perform ejection control in accordance with the ink type.

A filter 172 for removing foreign matters and bubbles is disposed in the middle of the channel connecting the ink supply tank 170 and the print head 160 as illustrated in FIG. 6. The filter mesh size in the filter 62 is desirably equivalent to or not more than the diameter of the nozzle of print head and commonly about 20 μm.

Although not illustrated in FIG. 6, it is desirable to provide a sub-tank integrally to the print head 160 or nearby the print head 160. The sub-tank has a damper function for preventing variation in the internal pressure of the head and a function for improving refilling of the print head.

The inkjet recording apparatus 100 is also provided with a cap 174 as a device to prevent the nozzles from drying out or to prevent an increase in the ink viscosity in the vicinity of the nozzles, and a cleaning blade 176 as a device to clean the ink ejection surface of the head 160.

A maintenance unit including the cap 174 and the cleaning blade 176 can be relatively moved with respect to the print head 160 by a movement mechanism (not illustrated), and is moved from a place for recording to a place above the maintenance unit as required.

The cap 174 is displaced up and down relatively with respect to the print head 160 by an elevator mechanism (not illustrated). When the power of the inkjet recording apparatus 100 is turned OFF or when the apparatus 100 is in a standby state for printing, the elevator mechanism raises the cap 174 to a predetermined elevated position so as to come into close contact with the print head 160, and the nozzle region of the nozzle surface 50A is thereby covered by the cap 174.

During printing or during standby, if the use frequency of a particular nozzle 161 has declined and the non-ejection of the ink continues for over a certain time, then the ink solvent in the vicinity of nozzles evaporates off and thereby the ink viscosity in the vicinity of the nozzle has increased. Once the ink reaches the state of this kind, it is difficult to eject the ink from the nozzles 161 even if the piezoelectric elements 168 operate.

Therefore, before a situation of this kind develops (namely, while the ink is within a range of viscosity which allows it to be ejected by operation of a piezoelectric element 168), the piezoelectric element 168 is operated, and a preliminary ejection ("purge", "blank ejection", "liquid ejection" or "dummy ejection") is carried out toward the cap 174 (ink receptacle), in order to expel the degraded ink (namely, the ink in the vicinity of the nozzle which has increased viscosity).

Furthermore, if air bubbles enter into the ink inside the head 160 (inside the pressure chamber 162), then even if the piezoelectric element 168 is operated, it may not be possible to eject ink from the nozzle. In a case of this kind, the cap 174 is placed on the head 160, the ink (ink containing air bubbles) inside the pressure chamber 162 is removed by suction, by means of a suction pump 177, and the ink removed by suction is then supplied to a recovery tank 178.

This suction operation is also carried out in order to remove degraded ink having increased viscosity (hardened ink), when ink is loaded into the head for the first time, and when the head starts to be used after having been out of use for a long period of time. Since the suction operation is carried out with respect to all of the ink inside the pressure chamber 162, the ink consumption is considerably large. Therefore, a mode in which preliminary ejection is carried out when the increase in the viscosity of the ink is still minor, is desirable.

The cleaning blade 176 is composed of rubber or another elastic member, and can slide on the ink ejection surface of the print head 160 by means of a blade movement mechanism (not illustrated). When ink droplets or foreign matter has adhered to the ink ejection surface, the ink ejection surface is wiped and cleaned by sliding the cleaning blade 176 on the ink ejection surface.

The inkjet recording apparatus 100 according to the present embodiment is provided in such a manner a nozzle having an ejection abnormality is judged from the read results of the in-line sensor 144 (see FIG. 1) and this judged ejection abnormality nozzle is subject to the recovery treatment. The recovery treatment according to the present embodiment includes the preliminary ejection and suction described above.

Description of Control System

Figure 7:
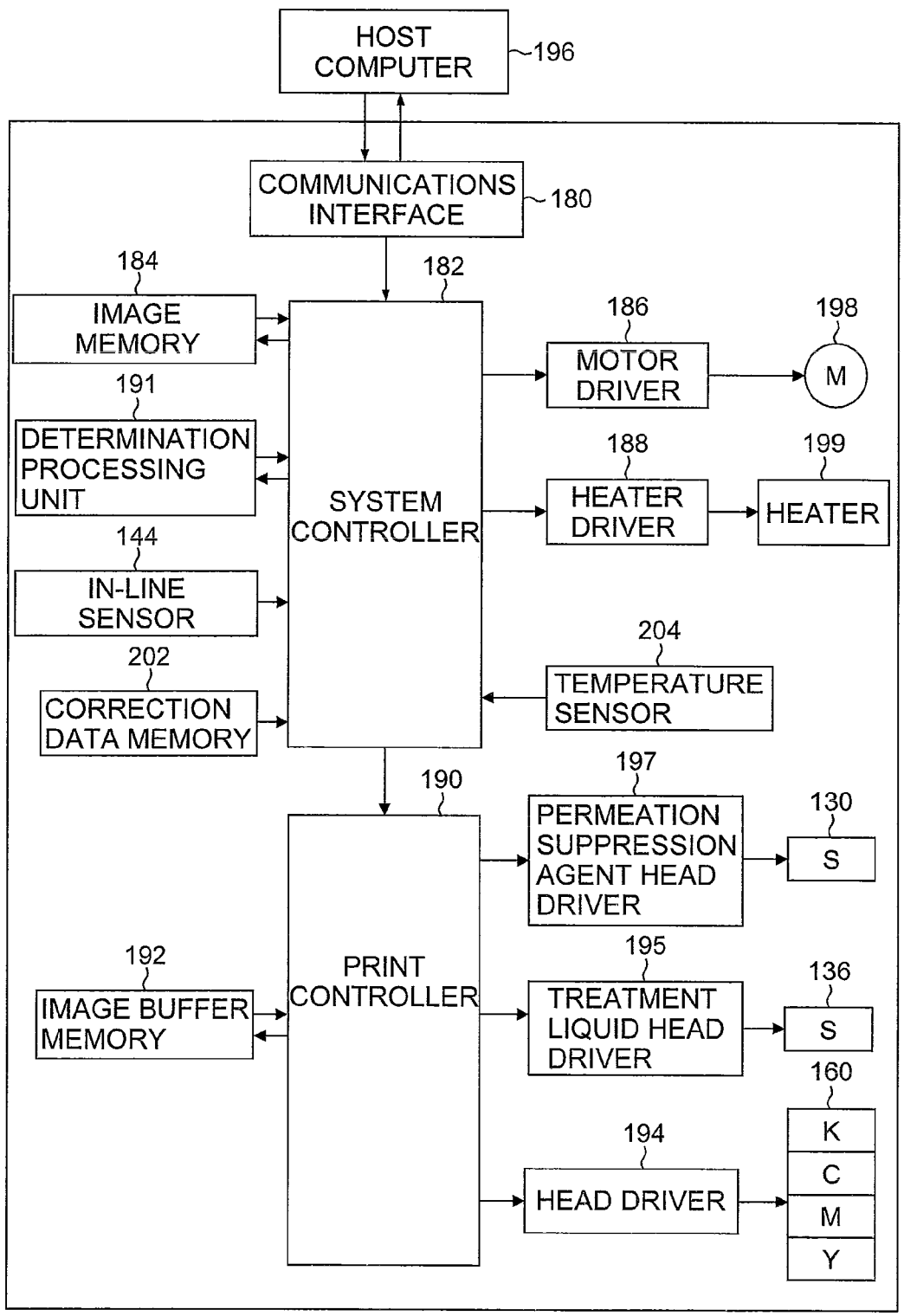
FIG. 7 is a principal block diagram illustrating a system configuration of the inkjet recording apparatus illustrated in FIG. 1.

FIG. 7 is a principal block diagram illustrating the system configuration of the inkjet recording apparatus 100. The inkjet recording apparatus 100 comprises a communications interface 180, a system controller 182, an image memory 184, a motor driver 186, a heater driver 188, a print controller 190, an image buffer memory 192, a head driver 194, and the like.

The communications interface 180 is an interface unit for receiving image data sent from a host computer 196. A serial interface such as USB (Universal Serial Bus), IEEE1394, Ethernet (registered trademark), wireless network, or a parallel interface such as a Centronics interface may be used as the communications interface 180. A buffer memory (not illustrated) may be mounted in this portion in order to increase the communication speed. The image data sent from the host computer 196 is received by the inkjet recording apparatus 100 through the communications interface 180, and is temporarily stored in the image memory 184.

The image memory 184 is a storage device for temporarily storing images inputted through the communications interface 180, and data is written and read to and from the image memory 184 through the system controller 182. The image memory 184 is not limited to a memory composed of semiconductor elements, and a hard disk drive or another magnetic medium may be used.

The system controller 182 is constituted by a central processing unit (CPU) and peripheral circuits thereof, and the like, and it functions as a control device for controlling the whole of the inkjet recording apparatus 100 in accordance with prescribed programs, as well as a calculation device for performing various calculations. More specifically, the system controller 182 controls the various sections, such as the communications interface 180, image memory 184, motor driver 186, heater driver 188, and the like, as well as controlling communications with the host computer 196 and writing and reading to and from the image memory 184, and it also generates control signals for controlling the motor 198 of the conveyance system and the heater 199.

Programs executed by the CPU of the system controller 182 and the various types of data which are required for control procedures are stored in the image memory 184. The image memory 184 may be a non-writeable storage device, or it may be a rewriteable storage device, such as an EEPROM. The image memory 184 is used as a temporary storage region for the image data, and it is also used as a program development region and a calculation work region for the CPU.

Various control programs are stored in the program storage unit (not illustrated), and a control program is read out and executed in accordance with commands from the system controller 182. The program storage unit may use a semiconductor memory, such as a ROM, EEPROM, or a magnetic disk, or the like. An external interface may be provided, and a memory card or PC card may also be used. Naturally, a plurality of these recording media may also be provided. The program storage unit may also be combined with a storage device for storing operational parameters, and the like.

The motor driver 186 is a driver which drives the motor 198 in accordance with instructions from the system controller 182. In FIG. 7, the motors (actuators) disposed in the respective sections of the apparatus are represented by the reference numeral 198. For example, the motor 198 illustrated in FIG. 7 includes motors which drive the pressure drums 126a to 126d in FIG. 1, the transfer drums 124a to 124d and the paper output drum 150.

The heater driver 188 is a driver which drives the heater 199 in accordance with instructions from the system controller 182. In FIG. 7, the plurality of heaters which are provided in the inkjet recording apparatus 100 are represented by the reference numeral 199. For example, the heater 199 illustrated in FIG. 7 includes the heaters of the paper preheating units 128 and 134 illustrated in FIG. 1, the permeation suppression agent drying unit 132, the treatment liquid drying unit 138, the solvent drying unit 142a and 142b, the heating rollers 148a and 148b, and the like.

The print controller 190 has a signal processing function for performing various tasks, compensations, and other types of processing for generating print control signals from the image data stored in the image memory 184 in accordance with commands from the system controller 182 so as to supply the generated print data (dot data) to the head driver 194, a permeation suppression agent head driver 197 and a treatment liquid head driver 195. Required signal processing is carried out in the print controller 190, and the ejection amount and the ejection timing of the ink droplets from the respective print heads 160 are controlled via the head driver 194, on the basis of the print data. By this means, desired dot size and dot positions can be achieved. Further, on the basis of the image data, the deposition volume and deposition timing of the permeation suppression agent of the permeation suppression agent head 130 are controlled via the permeation suppression agent head driver 197, and the deposition volume and deposition timing of the treatment liquid of the treatment liquid head 136 are controlled via the treatment liquid head driver 195.

The print controller 190 is provided with the image buffer memory 192; and image data, parameters, and other data are temporarily stored in the image buffer memory 192 when image data is processed in the print controller 190. Also possible is an aspect in which the print controller 190 and the system controller 182 are integrated to form a single processor.

The head driver 194 generates drive signals to be applied to the piezoelectric elements 168 of the head 160, on the basis of image data supplied from the print controller 190, and also comprises drive circuits which drive the piezoelectric elements 168 by applying the drive signals to the piezoelectric elements 168. A feedback control system for maintaining constant drive conditions in the head 160 may be included in the head driver 194 illustrated in FIG. 7.

The in-line sensor 144 is a block that includes the CCD line sensor as described above with reference to FIG. 1, reads the image printed on the recording medium 114, determines the print conditions (color, density, presence of the ejection, variation in the dot formation, and the like) by performing required signal processing, and the like, and provides the determination results of the print conditions to the determination processing unit 191 via the system controller 182.

The determination processing unit 191 performs the computation of the color measurement (colorimetry) and the density, and the like. Further, this determination processing unit 191 judges a nozzle suffering ejection abnormality on the basis of information obtained from the in-line sensor 144, and if the ejection abnormality can be corrected by means of image correction, sends control signals to the respective sections via the system controller 182 so as to perform image correction. Furthermore, if it is not possible to remedy the abnormality by means of image correction, then control signals are sent to the respective units via the system controller 182 in such a manner that preliminary ejection or suctioning is carried out in respect of the nozzle or nozzles suffering ejection abnormality.

In other words, the determination processing unit 191 functions as a control unit for in-line inspection which is carried out in the inkjet recording apparatus 100 illustrated in the present example. A mode is also possible in which the determination processing unit 191 is formed as a functional block which is built into the system controller 182 or print controller 190.

Further, the present apparatus includes a correction data memory 202 as a storage device that stores correction data such as arithmetic expressions used for corresponding to the conversion equations used for higher-order color correction, and conversion tables, and the like, and a temperature sensor 204 as a device for obtaining temperature information used in temperature correction. The correction data stored in the correction data memory 202 is defined based on tests for each ink type, sheet type, and treatment liquid type. The correction data to be applied is selected in accordance with the combination of ink type, sheet type, and treatment liquid type used. Also, it is possible to add, amend, and update, and so on, the correction data in the correction data memory 202. Therefore it is possible to deal with new ink types, sheet types, and treatment liquid types, and so on, by updating the correction data at any time.

The temperature sensor 204 measures either directly or indirectly the temperature of the recording medium 114 in the ink ejection unit 108 as explained in FIG. 1. For example, the temperature sensor 204 is disposed in a specific location to measure the surface temperature of the pressure drum 126c serving as a medium supporting device for supporting the recording medium 114 in the ink ejection unit 108.

Printing Operation by Inkjet Recording Apparatus

Next, actions of the inkjet recording apparatus having the above-described structure are described.

The recording medium 114 is conveyed to the feeder board 122 from the paper supply platform 120 of the paper supply unit 102. The recording medium 114 is held on the pressure drum 126a of the permeation suppression processing unit 104, via the transfer drum 124a, and is preheated by the paper preheating unit 128, and droplets of permeation suppression agent are ejected by the permeation suppression agent head 130. Thereupon, the recording medium 114 which is held on the pressure drum 126a is heated by the permeation suppression agent drying unit 132, and the solvent component (liquid component) of the permeation suppression agent is evaporated and dried.

The recording medium 114 which has been subjected to permeation suppression processing in this way is transferred from the pressure drum 126a of the permeation suppression processing unit 104 via the transfer drum 124b to the pressure drum 126b of the treatment liquid deposition unit 106. The recording medium 114 which is held on the pressure drum 126b is preheated by the paper preheating unit 134 and droplets of treatment liquid are ejected by the treatment liquid head 136. Thereupon, the recording medium 114 which is held on the pressure drum 126b is heated by the treatment liquid drying unit 138, and the solvent component (liquid component) of the treatment liquid is evaporated and dried. By this means, a layer of aggregating treatment agent in a solid state or semi-solid state is formed on the recording medium 114.

The recording medium 114 on which a solid or semi-solid layer of aggregating treatment agent has been formed is transferred from the pressure drum 126b of the treatment liquid deposition unit 106 via the transfer drum 124c to the pressure drum 126c of the ink ejection unit 108. Droplets of corresponding colored inks are ejected respectively from the ink heads 140M, 140K, 140C, 140Y, onto the recording medium 114 held on the pressure drum 126c, in accordance with the input image data.

When ink droplets are deposited onto the aggregating treatment agent layer, then the contact surface between the ink droplets and the aggregating treatment agent layer is a prescribed surface area when the ink lands, due to a balance between the propulsion energy and the surface energy. An aggregating reaction starts immediately after the ink droplets land on the aggregating treatment agent, but the aggregating reaction starts from the contact surface between the ink droplets and the aggregating treatment agent layer. Since the aggregating reaction occurs only in the vicinity of the contact surface, and the coloring material in the ink aggregates while receiving an adhesive force in the prescribed contact surface area upon landing of the ink, then movement of the coloring material is suppressed.

Even if another ink droplet is deposited adjacently to this ink droplet, since the coloring material of the previously deposited ink have already aggregated, then the coloring material does not mix with the subsequently deposited ink, and therefore bleeding is suppressed. After aggregation of the coloring material, the separated ink solvent spreads, and a liquid layer containing dissolved aggregating treatment agent is formed on the recording medium 114.

Thereupon, the recording medium 114 held on the pressure drum 126c is heated by the solvent drying units 142a and 142b, and the solvent component (liquid component) which has been separated from the ink aggregate on the recording medium 114 is evaporated off and dried. As a result, curling of the recording medium 114 is prevented, and furthermore deterioration of the image quality as a result of the presence of the solvent component can be restricted.

The recording medium 114 onto which colored inks have been deposited by the ink ejection unit 108 is transferred from the pressure drum 126c of the ink ejection unit 108 via the transfer drum 124d to the pressure drum 126d of the fixing processing unit 110. After the printing results achieved by the ink ejection unit 108 are read out by the in-line sensor 144 from the recording medium 114 held on the pressure drum 126d, then heating and pressure processing are carried out by the heating rollers 148a and 148b.

When the recording medium 114 is further transferred from the pressure drum 126d to the paper output drum 150, it is conveyed to the paper output platform 152 by the paper output chain 154. The recording medium 114 on which an image has been formed in this way is then conveyed onto the paper output platform 152 by the paper output chain 154 and is stacked on the paper output platform 152.

Explanation of Image Processing for Outputting Images

Figure 8:
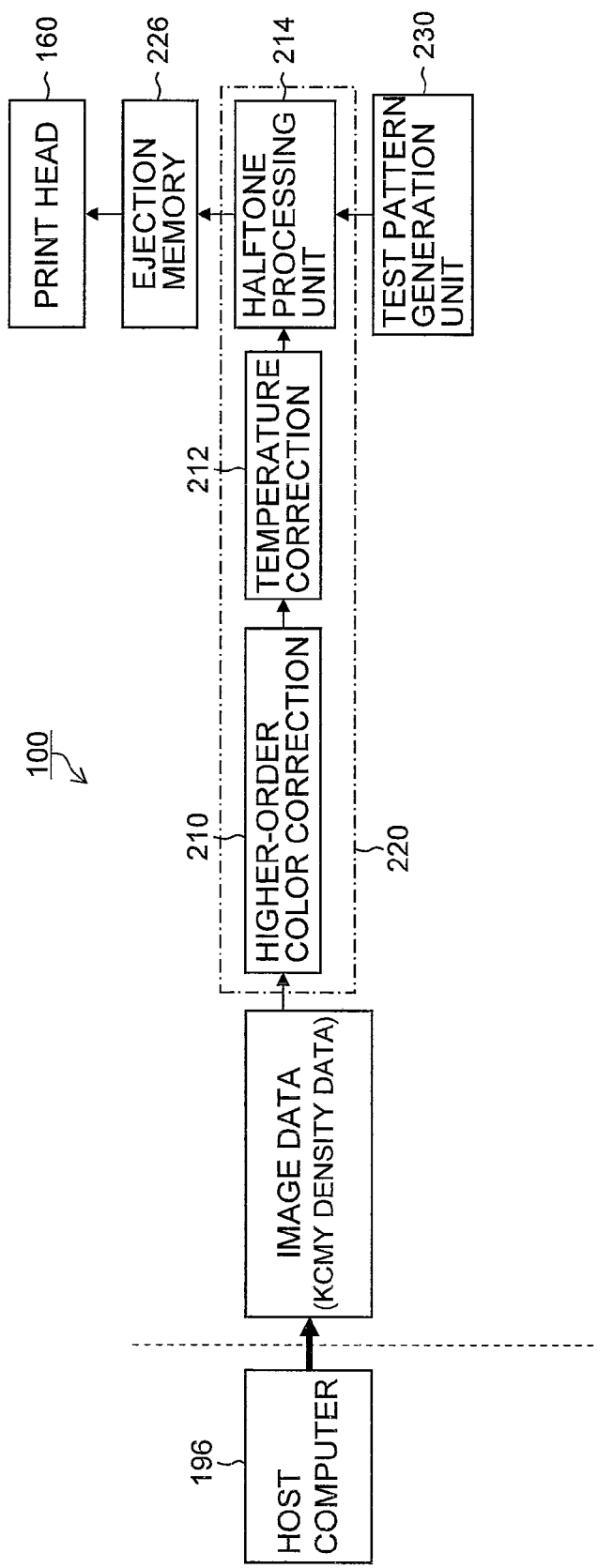
FIG. 8 is a block diagram illustrating a main composition of an imaging process in an inkjet recording apparatus related to one embodiment of the invention.

Next, the flow of image processing in the inkjet recording apparatus according to the present embodiment is explained. FIG. 8 is a block diagram illustrating a main composition of the imaging process.

A host computer 196 functions as a processing device that carries out the RIP process that converts electronic data to be printed, for example electronic data in page description language (PDL) or the like into raster images, the color conversion process from RGB to CMYK (RGB→CMYK), the gradation conversion process, and so on.

The color conversion process module of the host computer 196 uses a general purpose conversion module that is not specific to a specific output device (printer). Therefore the host computer 196 converts RGB signals into CMYK density data for each ink color corresponding to the ink colors of the output device (printer) using a general purpose color conversion algorithm that does not take into consideration the aggregating action of the treatment liquid in the inkjet recording apparatus 100 serving as an output device. If the recording resolution of the input original image and the output device (the nozzle resolution) are not the same, a picture element number conversion process is carried out on the input image in accordance with the resolution of the output device.

In this way, the image data (CMYK density data) for printing generated by the host computer 196 is transmitted to the printer side (the inkjet recording apparatus 100) via a specific communications interface. There is no particular limitation on the communication method, for example various types of communications interface can be used, such as RS232C, LVDS, CAN, or the like. When implementing the present embodiment, the RIP process and other functions may be provided on the printer side.

The inkjet recording apparatus 100 serving as an image output device includes an image processing device 220 that includes a higher-order color correction processing unit 210 for carrying out higher-order color correction of the input image data (CMYK density data), a temperature correction processing unit 212 for carrying out correction based on the environment temperature, and a half tone processing unit 214. This is explained in detail later, but the density data obtained after passing through the higher-order color correction and temperature correction is input to the half tone processing unit 214, and in the half tone processing unit 214 is converted into two-value printing data (dot data for each nozzle) or multi-value printing data (dot data for each nozzle) corresponding to the dot size type in accordance with an algorithm such as the error dispersion method or the dithering method.

In the present embodiment, the sizes of the ink droplets that can be ejected from the head 160 are 3 types: small, medium, and large. The half tone processing unit 214 carries out a multi-valued half tone process (for example, applying an error dispersion method with three threshold values) corresponding to the four states "no droplet (no ejection)/small droplet/medium droplet/large droplet". In this way ink ejection data is generated for each nozzle, and the ejection process is controlled. In other words, after the dot data generated by the half tone processing unit 214 is stored in a droplet ejection memory 226, it is output to the head 160, and droplets are ejected onto the recording medium 114 accordingly.

Also, the inkjet recording apparatus 100 of the present embodiment includes a test pattern generation unit 230 for generating image data (CMYK density data) for various kinds of test pattern. When necessary, density data representing a test pattern image is sent from the test pattern generation unit 230 to the half tone processing unit 214, and converted into dot data used for ink ejection of the test pattern. In the same way as for an image for printing, the dot data for the test pattern generated by the half tone processing unit 214 is output to the head 160 after being stored in the droplet ejection memory 226, and is printed on the recording medium 114.

Regarding the Higher-Order Color Correction Process

Next, the details of the process by the higher-order color processing unit 210 are explained.

For ejection in the sequence of M, K, C and Y (i.e. M→K→C→Y) in accordance with the sequence of arrangement of the heads in the ink ejection unit 108 as illustrated in FIG. 1, when ejecting K, the density data for K is corrected by reference to the preceding M image data. In other words, if there is already an ejected dot of M ink below formed in accordance with the M image data, a look up table (LUT) conversion function (conversion curve) for achieving the required K density is created. Then when ejecting K after ejecting the primary color M ink, the image data is converted into new data obtained from the conversion curve. Further, the density data after conversion is corrected based on the paper surface temperature in the temperature correction processing unit 212. A similar process is carried out for the higher-order colors (secondary color, tertiary color, quaternary color), and after the higher-order color density data is corrected, it is transmitted to the half tone processing unit 214.

The following is an explanation of the details of the correction process at each of the stages of the secondary color, the tertiary color, and quaternary color.

Secondary Color Data Correction

Figure 9:
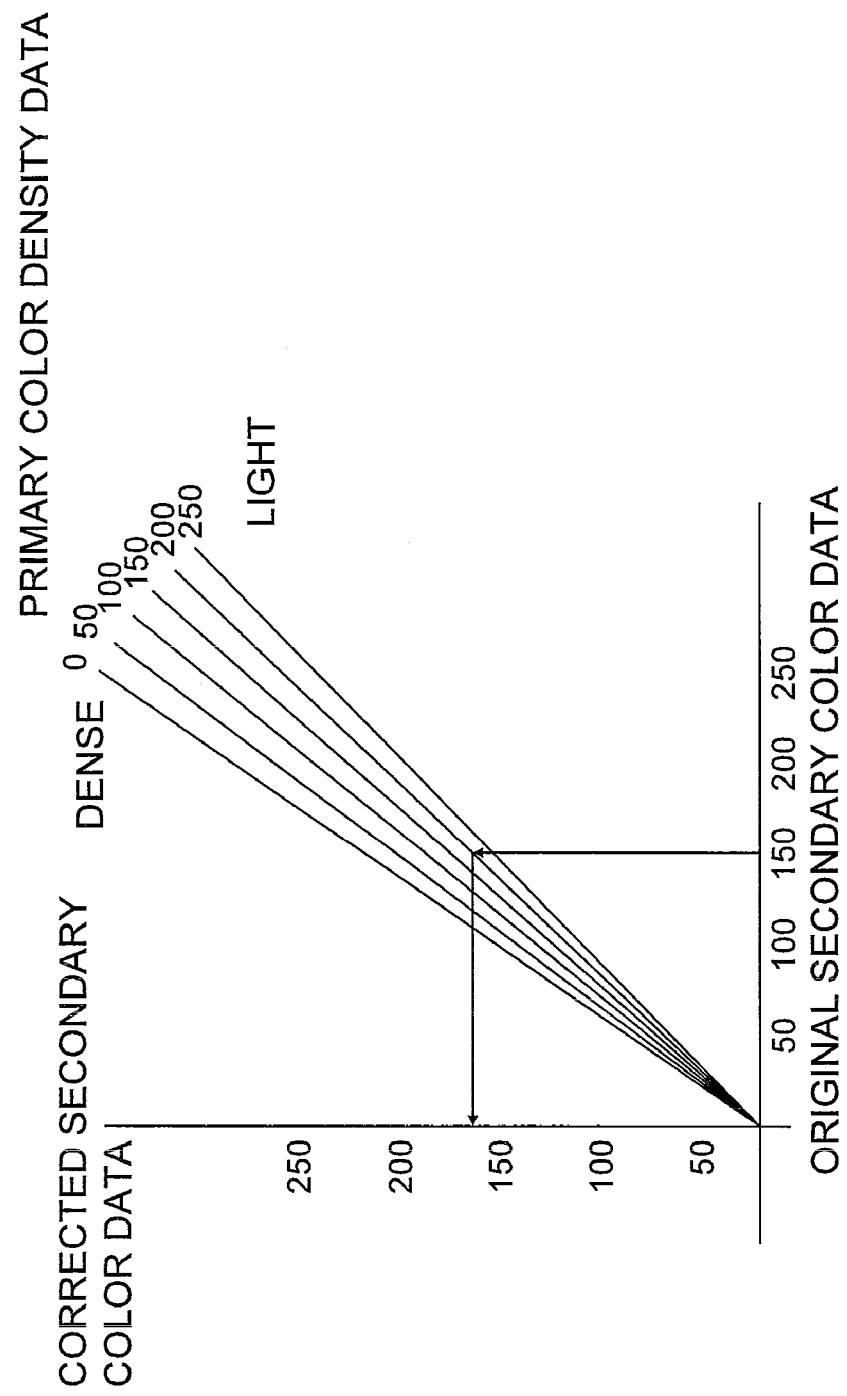
FIG. 9 is a diagram explaining a method of correcting a secondary color density data.

FIG. 9 is an example of the conversion function used when correcting the secondary color density data. The horizontal axis is the secondary color density data prior to correction, and the vertical axis is the secondary color density data after correction. Conversion equation functions (conversion curves) are defined corresponding to the primary color density data values 0 to 250. In the present embodiment, representative conversion curves are illustrated corresponding to the primary color density data 0, 50, 150, 200 and 250. In this figure, for convenience of explanation, the equation defining the relationship between the values before correction (input) and the values after correction (output) is assumed to be a first order function (straight line). However, the conversion function can be an arbitrary curve. This relationship is obtained from tests. Of the digital values 0 to 250, "0" represents the highest density, and "250" represents the lightest density.

Using the relationship (conversion function) in FIG. 9, the corrected secondary color density data can be obtained from the primary color density data and the secondary color density data. For example, from the conversion table of FIG. 9, when the primary color density value=200 and the secondary color density value before correction=150, then the corrected secondary color density value is about 160.

What this means is that the aggregation action is reduced by the effect of the lower layer ink ejection, the upper layer dot spreads, and therefore the correction is to make the data lighter.

Tertiary Color Data Correction

For correcting the tertiary color data, first the "lower color density data" achieved by superimposing the primary and secondary colors is obtained. This "lower color density data" is imaginary single color density data for evaluating the effect of the primary (M) and secondary (K) ink ejections already applied to the substrate, when ejecting the third color (tertiary color). In other words, the "lower color density data" represents an imaginary single color to be taken as an index for estimating the extent to which the aggregating action of the treatment liquid has been reduced by the preceding lower layer ejections (plurality of colors), from the point of view of the ink to be ejected in the upper layer.

Figure 10:
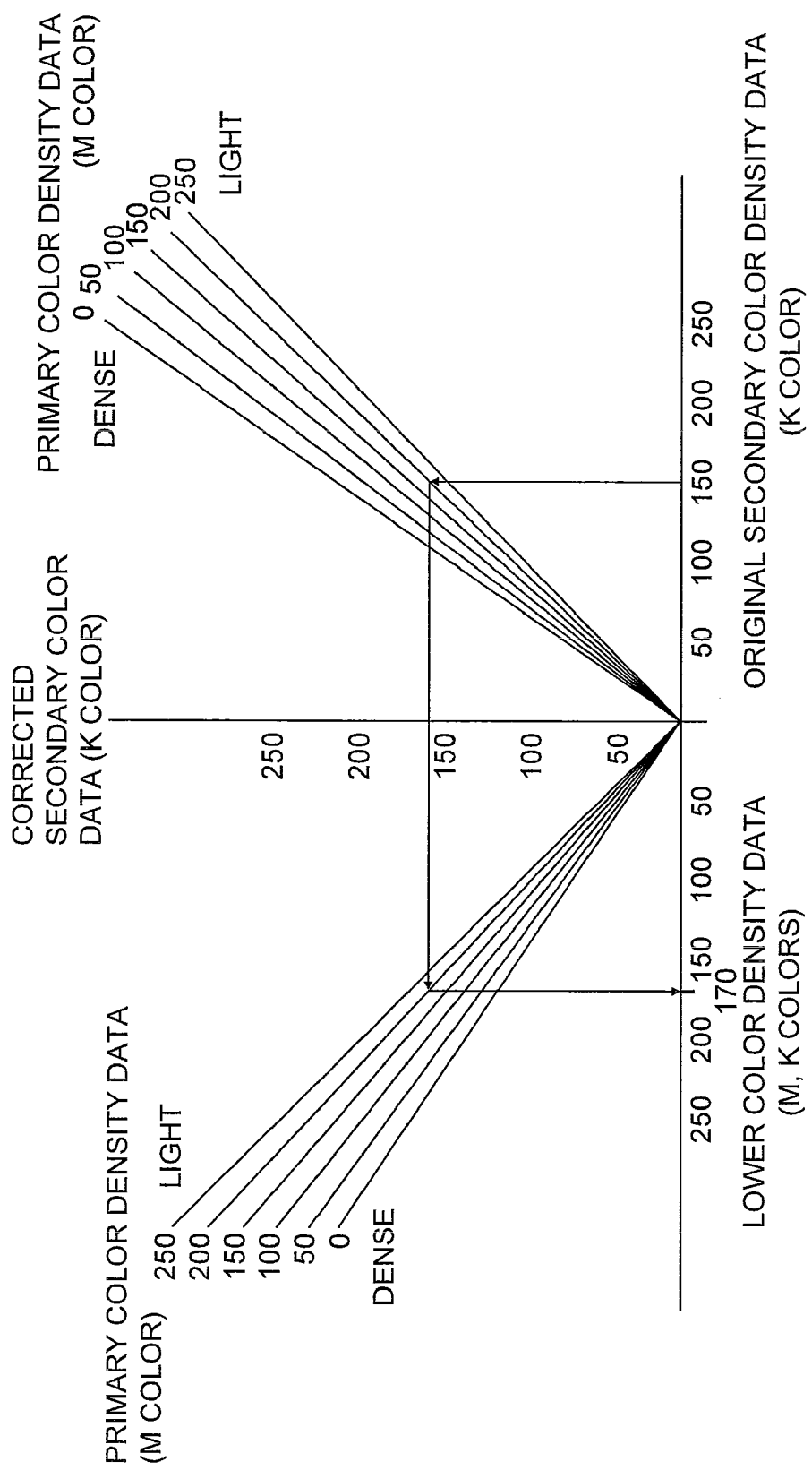
FIG. 10 is a diagram explaining a method of obtaining a lower color density data.

FIG. 10 is an example of the conversion function used to obtain the lower color density data. The horizontal axis on the right side of FIG. 10 (the first quadrant) is the secondary color density data before correction, and the vertical axis is the secondary color density data after correction. This is the same as that explained for FIG. 9. Also, the horizontal axis on the left side of FIG. 10 (the second quadrant) illustrates the "lower color image data" as a result of M and K. The conversion function on the left hand side allows the lower color density data (the value on the horizontal axis on the left side) to be obtained using the corrected secondary color data (the value on the vertical axis) and primary color density data. The conversion curves are defined in accordance with the primary color density data.

For example, if the corrected secondary color density data=160 (vertical axis value), then from the conversion curve corresponding to the primary color density data (M)=200, the lower color density data=170 (value on the left hand horizontal axis) is obtained.

Further, from this lower color density data and the tertiary color density data prior to correction, the corrected tertiary color density data is obtained.

Figure 11:
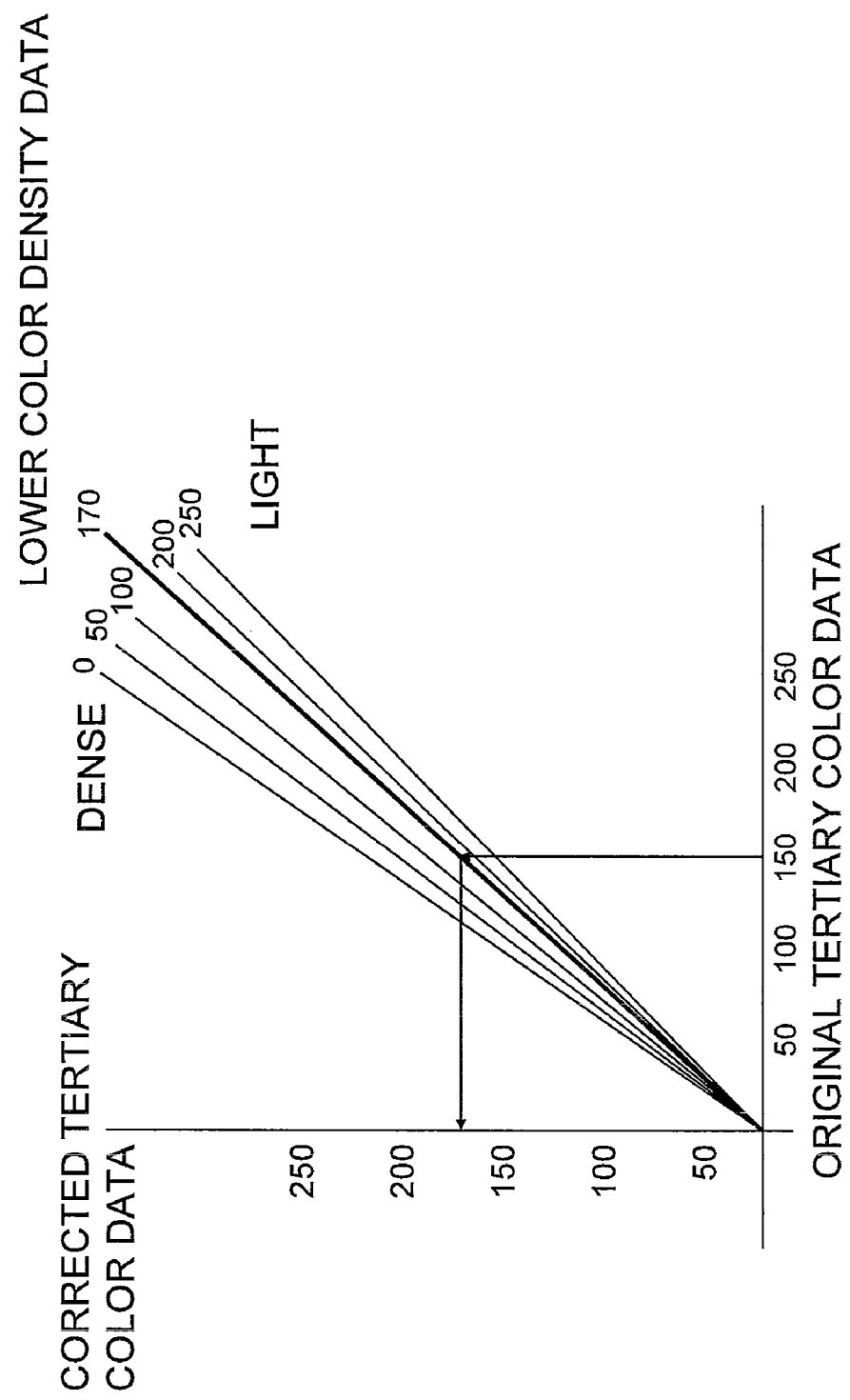
FIG. 11 is a diagram explaining a method of obtaining a tertiary color density data.

FIG. 11 is an example of the conversion function used for correcting the tertiary color density data. The horizontal axis is the tertiary color density data before correction, and the vertical axis is the tertiary color density data after correction. The conversion curve is defined corresponding to the values of the lower-order color density data explained in FIG. 10. For example, if the tertiary color density prior to correction (C)=150, then from the conversion curve corresponding to the lower color density data (M, K)=170, the corrected tertiary color density data=175 is obtained.

Quaternary Color Data Correction

Correction of the quaternary color data is similar to the correction of the tertiary color.

First the "second lower color density data" as a result of superimposing the primary to tertiary colors is obtained. This "second lower color density data" is imaginary single color density data for evaluating the effect of the primary color (M), the secondary color (K), and the tertiary color (C) that have already been applied to the substrate, when ejecting the fourth color (quaternary color).

FIG. 12 is an example of the conversion function used to obtain the second lower color density data. The horizontal axis on the right side of the figure (the first quadrant) is the tertiary color density data before correction, and the vertical axis is the tertiary color density data after correction. This is the same as that explained for FIG. 11. The left hand side of FIG. 12 allows the second lower color density data (the value on the horizontal axis on the left side) to be obtained using the corrected tertiary color data (the value on the vertical axis) and the lower color density data. The conversion curves are defined in accordance with the lower color density data.

For example, if the corrected tertiary color density data=175, from the conversion curve corresponding to the lower color density data (M, K)=170, the second lower color density data=175 is obtained.

Further, from this second lower color density data and the quaternary color density data prior to correction, the corrected quaternary color density data is obtained.

FIG. 13 is an example of the conversion function used for correcting the quaternary color density data. The horizontal axis is the quaternary color density data before correction, and the vertical axis is the quaternary color density data after correction. The correction curve is defined corresponding to the values of the second lower color density data explained in FIG. 12. For example, if the quaternary color density prior to correction (C)=150, then from the conversion curve corresponding to the second lower color density data (M, K, C)=175, the corrected quaternary color density data=178 is obtained.

It has been found from tests that the relationship between the density data of the droplets ejected and the optical density achieved in printing can be approximated by a straight line not only for the primary color, but also for the secondary color and tertiary color. Even without linear approximation, it is possible to convert the image data into corrected data when outputting, by obtaining and preparing in advance the types of relationship as described above.

Also, according to tests, the secondary color is the most affected of the higher-order colors. For the tertiary and quaternary colors, a change as large as that for the secondary color has not been found.

Temperature Correction

Further, the effect of the treatment liquid also varies with temperature, and tests have shown that this can be predicted. In other words, the aggregation action of the treatment liquid varies in accordance with the temperature of the paper surface. Therefore, as illustrated for example in FIGS. 14A to 14C, conversion curves at a number of temperatures, such as 20° C., 30° C., 40° C., and so on, are obtained in advance, and from the corrected density data obtained for the secondary color, the tertiary color, and the quaternary color as described above, correction is carried out based on the temperature of the sheet stage surface temperature (in the example of FIG. 1, the temperature of the peripheral surface of the pressure drum 126*c*) from the measurement result of the temperature sensor 204 immediately before outputting the image (immediately before inputting to the half tone processing unit 214). The change in the aggregation action due to temperature also affects the primary color, and therefore the same temperature correction is also carried out for the primary color density data.

Figure 14A:
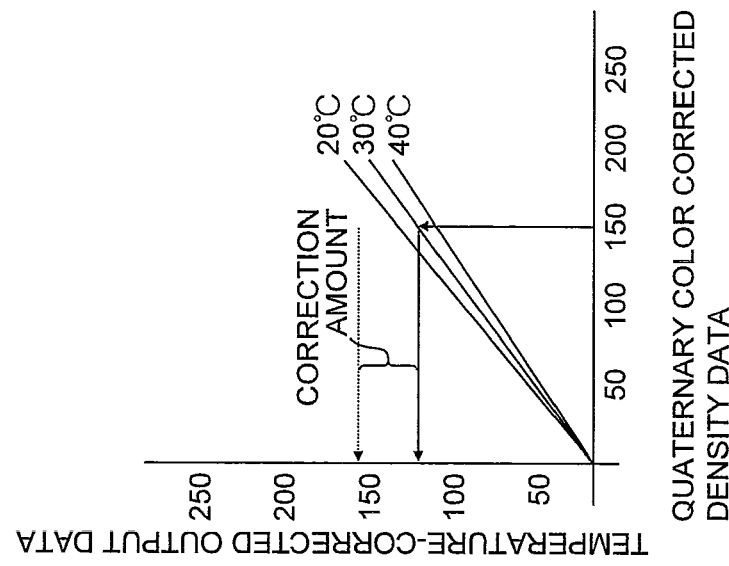
FIGS. 14A to 14C are diagrams each explaining a temperature correction process.
Figure 14B:
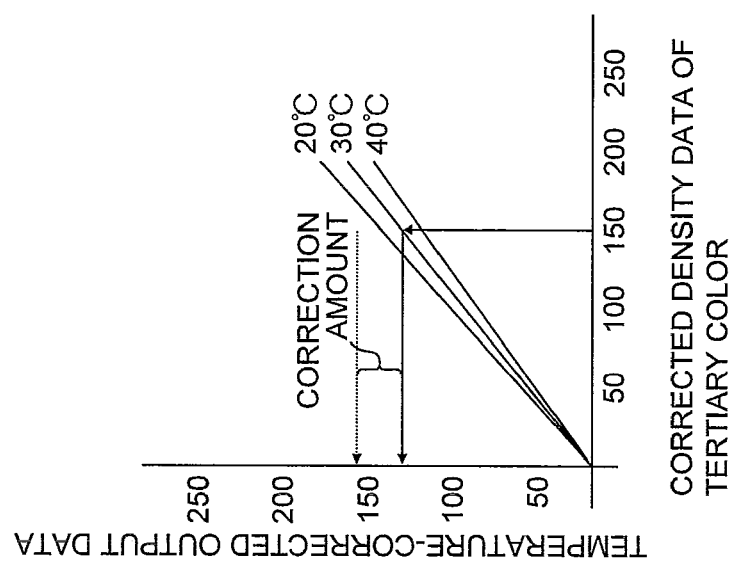
Figure 14C:
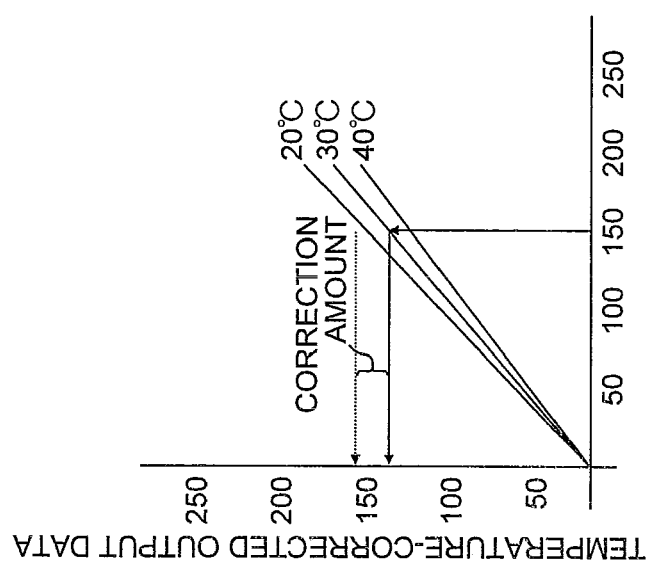

The reaction between the treatment liquid and the ink is normally faster, the higher the temperature, and therefore the ejected dot tends to be smaller and the density tends to be lighter. Therefore, as illustrated in FIGS. 14A to 14C, the higher the temperature, the more the density data is corrected in the direction of a higher density.

Acquisition of Temperature Information

Acquisition of temperature information when carrying out correction for temperature is not limited to direct measurement of the temperature using the temperature sensor 204. Color information can be extracted from the measurement results on set test patterns, and the temperature information can be obtained based on the color information.

For example, as illustrated in FIG. 15, an MCY layered test pattern 250 is formed in the four corners of the recording medium 114. The test pattern 250 is a test pattern (patch image) in which droplets are uniformly ejected so that the dots of M color as the primary color become 40% (half-tone %), the dots of C color as the secondary color ejected on top of M color become 60% (half-tone %), and the dots of Y color as the tertiary color ejected on top of C color become 60% (half-tone %).

The test pattern 250 is formed under the same conditions in the four corners outside of (in the non-image portion) the image area 252 where the intended image is printed.

This MCY layered test pattern 250 is measured by an in-line sensor 144. From the measured values coordinates are calculated, using a relationship between temperature, color hue, and color chroma (coordinates of the CIELab color system color charts) obtained in advance.

Figure 16:
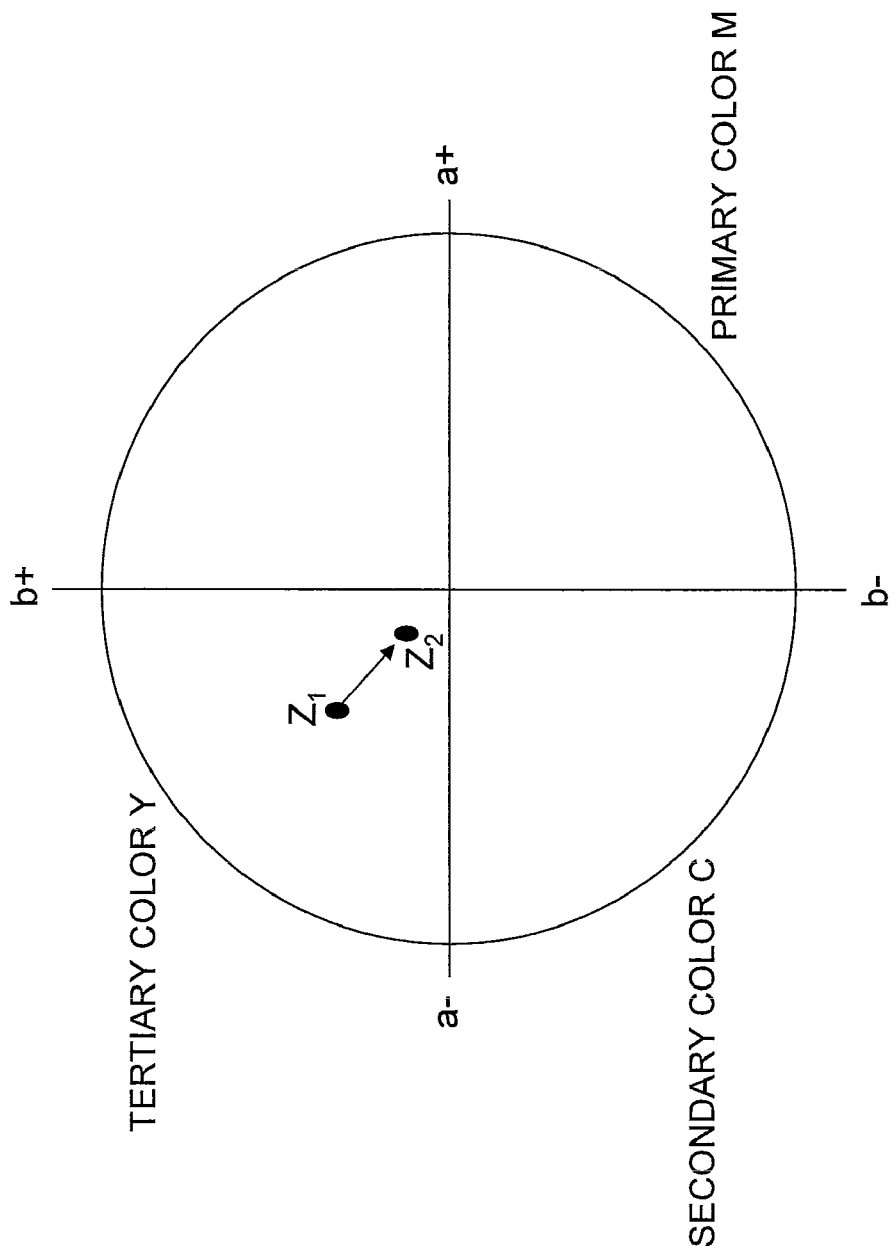
FIG. 16 is a diagram explaining a method of obtaining temperature information from color coordinates.

FIG. 16 illustrates an example of the change in color for the three colors MCY superimposed. The point $Z_1$ in the figure indicates the coordinates when the temperature is $T_1$, and the point $Z_2$ indicates the coordinates when the temperature is $T_2$ (where $T_1 < T_2$). For the ejection sequence of M, C and Y (i.e. M→C→Y), as the temperature rises, the C dot becomes smaller (the value of "a" in FIG. 16 increases) and the Y dot becomes smaller (the value of "b" in FIG. 16 decreases).

Therefore, temperature information can be obtained from this change in coordinates. Using the temperature information obtained in this way, correction and outputting based on temperature can be carried out in the temperature correction processing unit 212 as explained in FIG. 8.

By forming the test pattern 250 in the four corners for every sheet of all print images, and always taking measurements with the in-line sensor 144, it is possible to carry out the ideal temperature correction.

The image data that has been corrected based on temperature in this way is transmitted to the half tone processing unit 214, and converted into dot data corresponding to ejection from the nozzles.

Higher-Order Color Correction Flowchart

Figure 17:
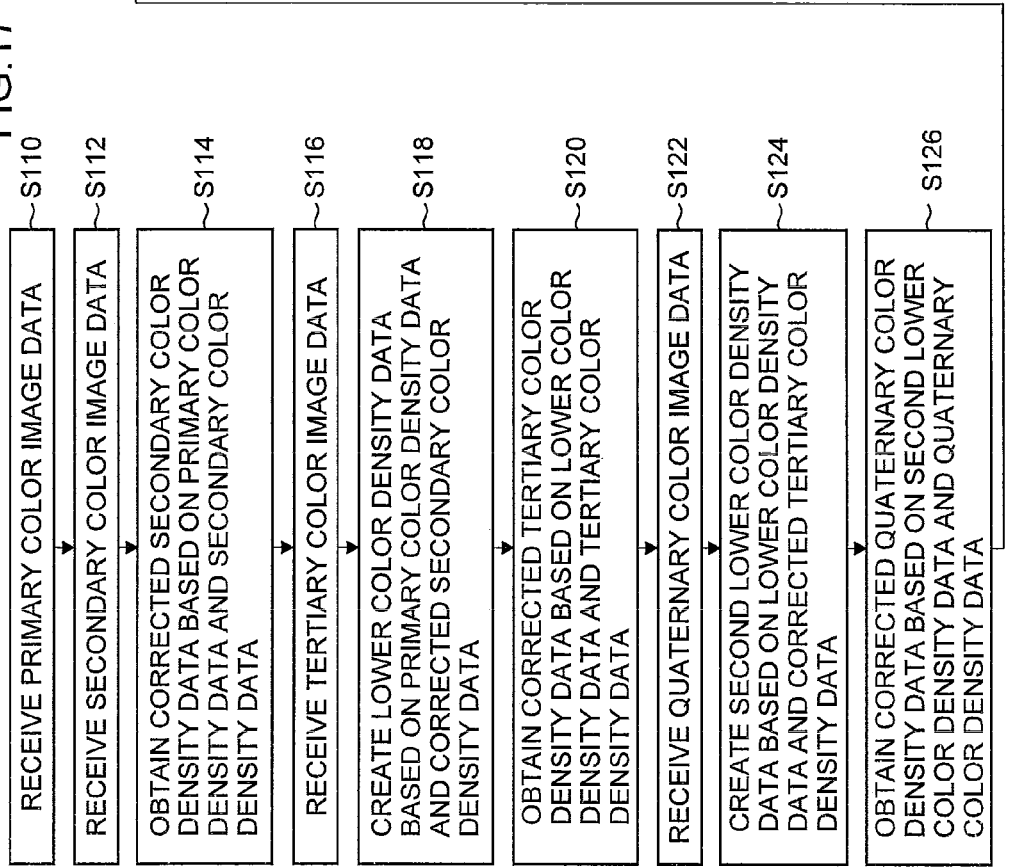
FIG. 17 is a flowchart of a process for carrying out higher-order color correction and temperature correction in an image forming unit of an inkjet recording apparatus related to one present embodiment of the invention.

FIG. 17 is a flowchart of the processes to carry out higher-order color correction and temperature correction as described above in the image processing unit of the inkjet recording apparatus according to the present embodiment.

First, the primary color image data and the secondary color image data are received (Steps S110 and S112), and for each picture element, the corrected second color density data is obtained based on the primary color density data and the secondary color density data (Step S114). This second color density data correction process corresponds to the process explained in FIG. 9.

Next, the tertiary color image data is received (Step S116 in FIG. 17). Then the lower density data is created based on the primary color density data and the corrected secondary color density data (Step S118). This process corresponds to the process explained in FIG. 10.

Next, the corrected tertiary color density data is obtained based on the obtained lower color density data and the tertiary color density data (Step S120 in FIG. 17). This process of correcting the tertiary color density data corresponds to the process explained in FIG. 11.

Next, the quaternary image data is received (Step S122 in FIG. 17). Then the second lower color density data is created from the lower color density data and the corrected tertiary color density data (Step S124). This process corresponds to the process explained in FIG. 12.

Next, the corrected quaternary color density data is obtained based on the obtained second lower color density data and the quaternary color density data (Step S126 in FIG. 17). This process of correcting the quaternary color density data corresponds to the process explained in FIG. 13.

In this way, the corrected secondary color, tertiary color, and quaternary color image data is obtained. When ejecting each ink color, further temperature correction is carried out. In other words, a correction process is carried out for the primary color image data in accordance with the sheet surface temperature (Step S128), and after correction, the image data is converted into dot data and ejection of the primary color ink is carried out (Step S130 in FIG. 17).

Likewise, a correction process is carried out for the secondary color image data after higher-order color correction in accordance with the sheet surface temperature (Step S132), and after temperature correction the image data is converted to dot data and ejection of the secondary color ink is carried out (Step S134 in FIG. 17).

A similar temperature correction is carried out for the tertiary color and the quaternary color, and ejection of their inks is carried out (Steps S136 to S142).

Combination with an Unevenness Correction Process

Desirably, a process for correction of unevenness of density caused by the ejection characteristics of each nozzle, the ejection position, non-ejection, and so on, is combined with the higher-order color correction process and the temperature correction process as described above.

Automatic Measurement by the in-Line Sensor (1) Automatic Measurement for a Periodic Correction Function or for Each Job The inkjet recording apparatus 100 according to the present embodiment includes an automatic correction function that outputs a special test patch for checking the density correction effect, and automatically checks the correction function and carries out the necessary adjustments periodically (for example, every one hour), or for every print job, or for every specified number of sheets output.

Figure 18:
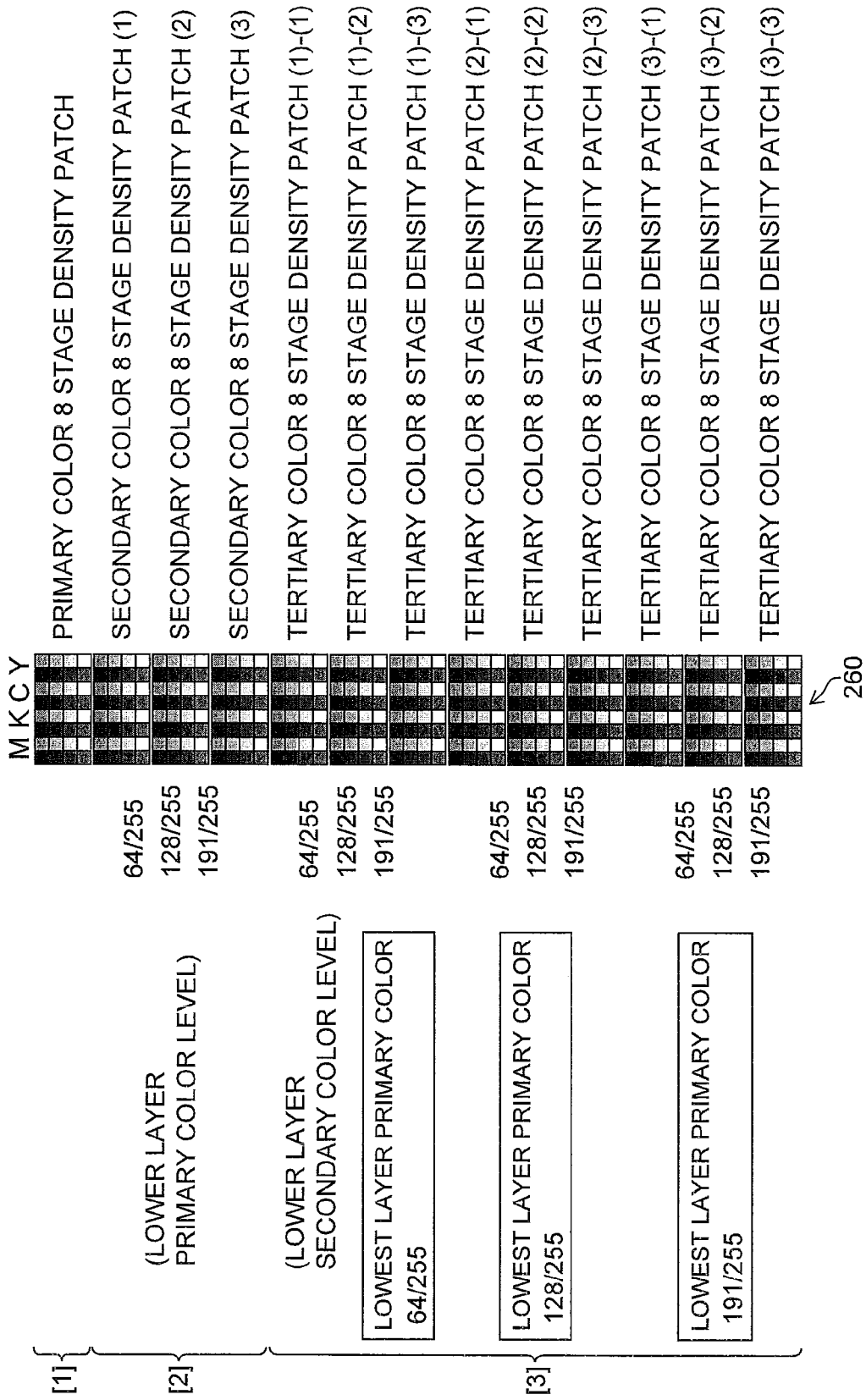
FIG. 18 is an explanatory diagram illustrating an example of patch set for color correction.

FIG. 18 is an explanatory diagram illustrating an example of a patch set for higher-order color correction that is output for this automatic measurement. In the example illustrated in the figure, [1] a primary color density patch, [2] a secondary color density patch, and [3] a tertiary color density patch are included.

The primary color density patch in [1] illustrates eight patches (patches of eight stages) classified by density with respect to the maximum density (0) of four colors of the image output device, and is formed with eight patches for each of the four colors MKCY corresponding to each density of, for example, 32/255, 64/255, 96/255, 128/255, 159/255, 191/255, 223/255, and 255/255.

The secondary color density patch illustrated in [2] is formed with eight stages of the secondary color (eight—32/255, 64/255, 96/255, 128/255, 159/255, 191/255, 223/255, and 255/255) on patches of the primary color in three densities 64/255, 128/255, and 191/255. This is used for comparison with the lower color density data.

The tertiary color density patch illustrated in [3] is formed with eight stages of the tertiary color (eight—32/255, 64/255, 96/255, 128/255, 159/255, 191/255, 223/255, and 255/255) on patches of the secondary color in three densities 64/255, 128/255, on patches of the primary color in three densities 64/255, 128/255, and 191/255. This is used for comparison with the second lower color density data.

Figure 19:
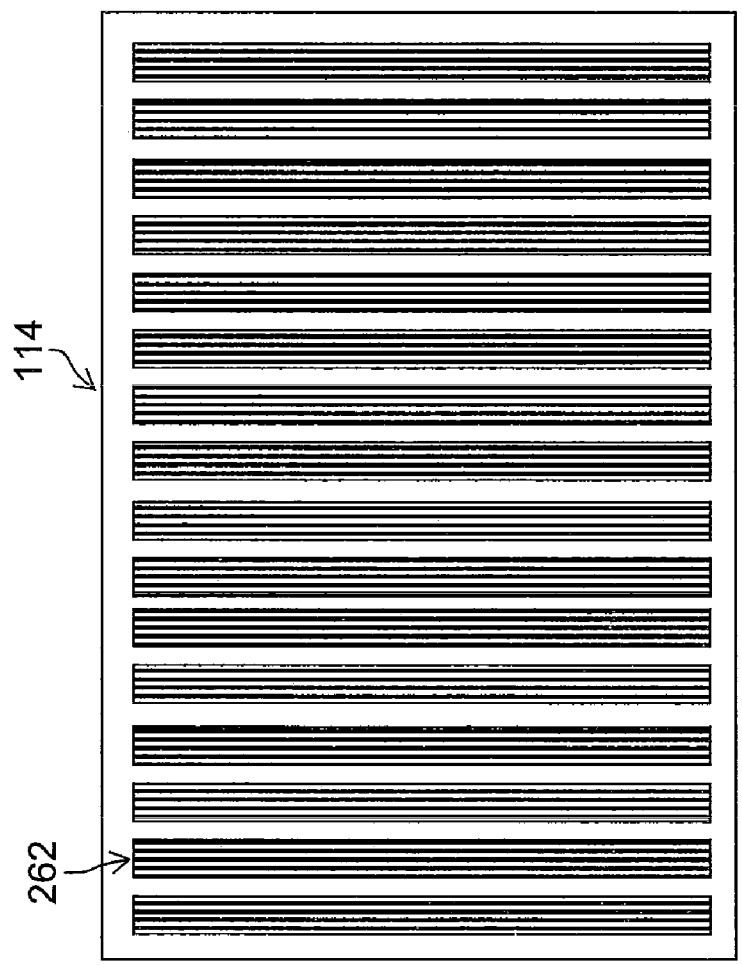
FIG. 19 is an explanatory diagram illustrating an example of forming a patch set on the whole surface of a recording medium.

As illustrated in FIG. 19, this patch set 260 is arranged on the whole surface of the recording medium 114, is output periodically or for every job, and is measured by the in-line sensor 144. The vertical patch columns in FIG. 19 (reference numeral 262) correspond to a patch column of the patch set 260 that includes [1] to [3] in FIG. 18. If there is unevenness in the density according to location within the sheet, for example if there is unevenness in application of the treatment liquid, in that part the correction curve is modified. Also, if there is a change across the whole surface with the passage of time, the modification based on the temperature correction is carried out.

For example, if the density of the whole image in the patch set ([1] to [3] in FIG. 18) is displaced in the lighter direction, the temperature correction used for ejection is shifted lower. In other words, the image output device recognizes the temperature as being lower than the actual temperature. In this way, it can be determined whether it is necessary to modify the temperature correction depending on whether or not the areas of the primary color density patch [1], the secondary color density patch [2], and the tertiary color density patch [3] all have the same trends.

(2) Case where the Correction Effect is Checked Every Time the Image is Output

In the pattern in FIG. 19, an example of forming the patch set over the whole surface of a single sheet periodically or for every job was described. However, the present embodiment is not limited to this. As illustrated in FIG. 20, a pattern in which for every image output, the patch set is formed on the end portions of the output image (a front end portion 264 and a back end portion 266) every time, and for every output a check on whether the higher-order color correction and the temperature correction are correct or not can be carried out. If all areas of the patch set ([1] to [3] in the figure) are displaced in the dark direction, it can be understood that the image output device is recognizing the temperature as higher than actual. In this case, the temperature correction is modified to the low temperature side.

Updating the Correction Data Stored at the Time of Manufacture of the Apparatus

The aggregation action of the treatment liquid varies greatly depending on the type of sheet that constitutes the substrate and the type of ink ejected onto the lower layer. Therefore, experimental correction data is created in advance for combinations of one or a plurality of ink types, recording media types, and treatment liquid types that are likely to be used, and the correction data is stored in the correction data memory 202. The correction data is selected in accordance with the conditions during use, and used for correction.

The correction data is provided as a data set of the amount of correction for each ink type, sheet type, and treatment liquid type from the manufacturer to the customer that uses the image output apparatus (inkjet recording apparatus). It may be necessary to update the correction data stored at the time of manufacture of the apparatus, depending on the ink type, the sheet, or the treatment liquid used.

The data in the correction data memory 202 can be overwritten and updated with correction data supplied from the manufacturer, or the like, for new combinations of ink type, sheet type, and treatment liquid type that are not stored in the correction data memory 202. The correction function of the image output apparatus is updated by the supplied correction data set, so that images can be corrected and output in the same way for new ink types, sheet types, and treatment liquid also.

With a composition that is a combination of a general purpose color conversion module and a higher-order color correction function, as in the present embodiment, there are beneficial effects that the quantity of data that would be better of being updated for compatibility with new ink types, sheet types, or treatment liquid types is comparatively small.

Other Actions And Effects Of Embodiments Of The Present Invention

<1> In the two-part aggregation system in which images are formed with ink on treatment liquid, a function to correct the density data for forming the upper ink layers with reference to the density data of the lower layers can be achieved.

In other words, an image output apparatus (inkjet recording apparatus) has been provided in which a correction and conversion LUT or table for the higher-order colors is stored for each image density data and/or each temperature of a lower-layer ink on the substrate, and the higher-order colors are corrected and outputted.

<2> A function to measure the corrected output results for the higher-order colors by the in-line sensor 144 and modify the amount of correction accordingly, can be achieved.

<3> A function to measure the correction results based on temperature by the in-line sensor 144 and modify the amount of correction, can be achieved.

In other words, an image output apparatus is provided in which a test pattern is measured with the in-line sensor and the correction conditions are selected.

The corrected output results of the higher-order colors can be measured by the in-line sensor 144 to check whether the amount of correction is proper or not, and therefore, it is possible to improve the stability of image reproduction. Also, it is possible to improve the image quality reproducibility of the output printed material according to the environmental temperature and humidity.

<4> A function for updating and replacement of the correction data sets for each combination of ink type, sheet type, and treatment liquid type can be achieved. In other words, an image output apparatus has been provided in which the correction conditions are stored for each combination of ink, sheet, and treatment liquid, and when the combination is changed, the correction conditions are changed and then the outputting is carried out.

By enabling the data for calculating the amount of correction to be updated, if the ink type, sheet type, or treatment liquid is changed, or if they are improved, it is possible to maintain conditions in such a manner that the amount of correction suitable for this is obtained.

Specific Examples of Permeation Suppression Agent, Treatment Liquid, and Ink

The following are examples of preparation of the permeation suppression agent, treatment liquid, and ink used in the present embodiment.

Permeation Suppression Agent

A mixed solution was prepared by mixing 10 g of a dispersion stabilizer resin (Q-1) having the following structure:

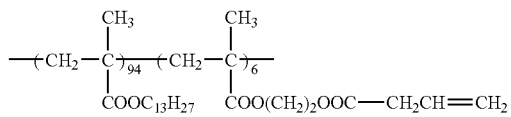

$\overline{M}w=4\times10^4$ (Weight composition ratio), 100 g of vinyl acetate and 384 g of Isopar PI (made by ExxonMobil), and was heated to a temperature of 70° C. while being agitated in a nitrogen gas flow. Then, 0.8 g of 2,2'-azobis(isovaleronitrile) (A.I.V.N.) was added as a polymerization initiator, and the mixture was made to react for 3 hours. 20 minutes after adding the polymerization initiator, white turbidity was produced and the reaction temperature rose to 88° C. A further 0.5 g of polymerization initiator was added and after making reaction for 2 hours, the temperature was raised to 100° C. and the mixture was agitated for 2 hours. Then, vinyl acetate that had not reacted was removed. The mixture was cooled and then passed through a 200-mesh nylon cloth. The white dispersed material thereby obtained was a latex having a polymerization rate of 90%, an average particle size of 0.23 μm and good monodisperse properties. The particle size was measured with a CAPA-500 (made by HORIBA, Ltd.).

A portion of the white dispersed material was placed in a centrifuge (for example, rotational speed: $1\times10^4$ r.p.m.; operating duration: 60 minutes), and the precipitated resin particles were collected and dried. The weight-average molecular weight (Mw), glass transition point (Tg) and minimum film forming temperature (MFT) of the resin particles were measured as follows: Mw was $2\times10^5$ (GPC value converted to value for polystyrene), Tg was 38° C. and MFT was 28° C.

The permeation suppression agent thus prepared was applied onto the recording paper. When the permeation suppression agent was applied, the recording paper was heated by a drum. After the permeation suppression agent was applied, Isopar H was evaporated by heated air blowing.

Treatment Liquid

| | |
|---|---|
| The treatment liquid was prepared by mixing the following | 16.7% |
| Citric acid: (made by Wako Pure Chemical Industries) | |
| Diethylene glycol monomethyl ether: | 20.0% |
| (made by Wako Pure Chemical Industries) | |
| Zonyl FSN-100 (made by DuPont): | 1.0% |
| Deionized water: | 62.3% |

The physical properties of the treatment liquid thus prepared were measured as: the viscosity was 4.9 mPa·s, the surface tension was 24.3 mN/m and the pH was 1.5.

Ink (Preparation of Polymer Dispersant P-1)

88 g of methylethyl ketone was introduced into a 1000 ml three-mouthed flask fitted with an agitator and cooling tube, and was heated to 72° C. in a nitrogen atmosphere, whereupon a solution formed by dissolving 0.85 g of dimethyl 2,2'-azobis isobutylate, 60 g of benzyl methacrylate, 10 g of methacrylic acid and 30 g of methyl methacrylate in 50 g of methylethyl ketone was added to the flask by titration over three hours. When titration had been completed and after reacting for a further hour, a solution of 0.42 g of dimethyl 2,2'-asobis isobutylate dissolved in 2 g of methylethyl ketone was added, the temperature was raised to 78° C. and the mixture was heated for 4 hours. The reaction solution thus obtained was deposited twice in an excess amount of hexane, and the precipitated resin was dried, yielding 96 g of a polymer dispersant P-1.

The composition of the resin thus obtained was confirmed using a 1H-NMR, and the weight-average molecular weight (Mw) determined by GPC (Gel Permeation Chromatography) was 44600. Moreover, the acid number of the polymer was 65.2 mg KOH/g as determined by the method described in Japanese Industrial Standards (JIS) specifications (JIS K 0070-1992).

Preparation of Cyan Dispersion Liquid 10 parts of Pigment Blue 15:3 (phthalocyanine blue A220 made by Dainichi Seika Color & Chemicals), 5 parts of the polymer dispersant P-1 obtained as described above, 42 parts of methylethyl ketone, 5.5 parts of an aqueous 1 mol/L NaOH solution, and 87.2 parts of deionized water were mixed together, and dispersed for 2 to 6 hours using 0.1 mm diameter zirconia beads in a beads mill.

The methylethyl ketone was removed from the obtained dispersion at 55° C. under reduced pressure, and moreover a portion of the water was removed, thus obtaining a cyan dispersion liquid having a pigment concentration of 10.2 wt %.

The cyan dispersion liquid forming a coloring material was prepared as described above. Ink 1 was prepared by using the coloring material (cyan dispersion liquid) obtained as described above and mixing the components so as to obtain the following ink composition.

Example of Composition of Ink

| | |
|---|---|
| Cyan pigment (Pigment Blue 15:3) | 4% |
| Polymer dispersant (P-1 described above) | 2% |
| Trioxypropylene glyceryl ether | 15% |
| (Sannix GP250 (made by Sanyo Chemical Industries)) | |
| Olefin E1010 (a surfactant, made by Nisshin Chemical Industry) | 1% |
| Deionized water | 78% |

Regarding Ink

It is desirable that the concentration of the solvent-insoluble materials in the ink is not less than 1 wt % and not more than 20 wt %, taking account of the fact that the viscosity of the ink suitable for ejection is 20 mPa·s or lower. It is more desirable that the concentration of the pigment in the ink is not less than 4 wt %, in order to obtain good optical density in the image. It is desirable that the surface tension of the ink is not less than 20 mN/m and not more than 40 mN/m, taking account of ejection stability in the ink ejection head.

The coloring material in the ink may be pigment or a combination of pigment and dye. From the viewpoint of the aggregating characteristics when the ink comes into contact with the treatment liquid, a dispersed pigment in the ink is desirable for more effective aggregation. Desirable pigments include: a pigment dispersed by a dispersant, a self-dispersing pigment, a pigment in which the pigment particle is coated with a resin (hereinafter referred to as "microcapsule pigment"), and a polymer grafted pigment. Moreover, from the viewpoint of the aggregating characteristics of the coloring material, it is more desirable that the coloring material is modified with a carboxyl group having a low degree of disassociation.

There are no particular restrictions on the resin used for a microcapsule pigment, but desirably, it should be a compound of high molecular weight which has a self-dispersing capability or solubility in water, and contains an anionic group (acidic). Generally, it is desirable that the resin should have a number average molecular weight in the approximate range of 1,000 to 100,000, and especially desirably, in the approximate range of 3,000 to 50,000. Moreover, desirably, this resin can dissolved in an organic solvent to form a solution. By limiting the number average molecular weight of the resin to this range, it is possible to make the resin display satisfactory functions as a covering film for the pigment particle, or as a coating film in the ink composition.

The resin may itself have a self-dispersing capability or solubility, or these functions may be added or introduced. For example, it is possible to use a resin having an introduced carboxyl group, sulfonic acid group, or phosphonic acid group or another anionic group, by neutralizing with an organic amine or alkali metal. Moreover, it is also possible to use a resin into which one or two or more anionic groups of the same type or different types have been introduced. In the embodiment of the present invention, it is desirable to use a resin which has been neutralized by means of a salt and which contains an introduced carboxyl group.

There are no particular restrictions on the pigment used in the present embodiment, and specific examples of orange and yellow pigments are: C. I. Pigment Orange 31, C. I. Pigment Orange 43, C. I. Pigment Yellow 12, C. I. Pigment Yellow 13, C. I. Pigment Yellow 14, C. I. Pigment Yellow 15, C. I. Pigment Yellow 17, C. I. Pigment Yellow 74, C. I. Pigment Yellow 93, C. I. Pigment Yellow 94, C. I. Pigment Yellow 128, C. I. Pigment Yellow 138, C. I. Pigment Yellow 151, C. I. Pigment Yellow 155, C. I. Pigment Yellow 180, and C.I. Pigment Yellow 185.

Specific examples of red and magenta pigments are: C. I. Pigment Red 2, C. I. Pigment Red 3, C. I. Pigment Red 5, C. I. Pigment Red 6, C. I. Pigment Red 7, C. I. Pigment Red 15, C. I. Pigment Red 16, C. I. Pigment Red 48:1, C. I. Pigment Red 53:1, C. I. Pigment Red 57:1, C. I. Pigment Red 122, C. I. Pigment Red 123, C. I. Pigment Red 139, C. I. Pigment Red 144, C. I. Pigment Red 149, C. I. Pigment Red 166, C. I. Pigment Red 177, C. I. Pigment Red 178, and C.I. Pigment Red 222.

Specific examples of green and cyan pigments are: C. I. Pigment Blue 15, C. I. Pigment Blue 15:2, C. I. Pigment Blue 15:3, C. I. Pigment Blue 16, C. I. Pigment Blue 60, and C.I. Pigment Green 7.

Specific examples of a black pigment are: C.I. Pigment Black 1, C.I. Pigment Black 6, and C.I. Pigment Black 7.

It is desirable in the present embodiment that the ink contains polymer particles that do not contain any colorant, as a component for reacting with the treatment liquid. The polymer particles can improve the image quality by strengthening the ink viscosity raising action and the aggregating action through reaction with the treatment liquid. In particular, a highly stable ink can be obtained by adding anionic polymer particles to the ink.

By using the ink containing the polymer particles that produce the viscosity raising action and the aggregating action through reaction with the treatment liquid, it is possible to increase the quality of the image, and at the same time, depending on the type of polymer particles, the polymer particles may form a film on the recording medium, and therefore beneficial effects can be obtained in improving the wear resistance and the waterproofing characteristics of the image.

The method of dispersing the polymer particles in the ink is not limited to adding an emulsion of the polymer particles to the ink, and the resin may also be dissolved, or included in the form of a colloidal dispersion, in the ink.

The polymer particles may be dispersed by using an emulsifier, or the polymer particles may be dispersed without using any emulsifier. For the emulsifier, a surface active agent of low molecular weight is generally used, and it is also possible to use a surface active agent of high molecular weight. It is also desirable to use a capsule type of polymer particles having an outer shell composed of acrylic acid, methacrylic acid, or the like (core-shell type of polymer particles in which the composition is different between the core portion and the outer shell portion).

The polymer particles dispersed without any surface active agent of low molecular weight are known as the soap-free latex, which includes polymer particles with no emulsifier or a surface active agent of high molecular weight. For example, the soap-free latex includes polymer particles that use, as an emulsifier, the above-described polymer having a water-soluble group, such as a sulfonic acid group or carboxylic acid group (a polymer with a grafted water-soluble group, or a block polymer obtained from a monomer having a water-soluble group and a monomer having an insoluble part). It is especially desirable in the present embodiment to use the soap-free latex compared to other type of resin particles obtained by polymerization using an emulsifier, since there is no possibility that the emulsifier inhibits the aggregating reaction and film formation of the polymer particles, or that the free emulsifier moves to the surface after film formation of the polymer particles and thereby degrades the adhesive properties between the recording medium and the ink aggregate in which the coloring material and the polymer particles are combined.

Examples of the resin component added as the resin particles to the ink include: an acrylic resin, a vinyl acetate resin, a styrene-butadiene resin, a vinyl chloride resin, an acryl-styrene resin, a butadiene resin, and a styrene resin.

In order to make the polymer particles have high speed aggregation characteristics, it is desirable that the polymer particles contain a carboxylic acid group having a low degree of disassociation. Since the carboxylic acid group is readily affected by change of pH, then the polymer particles containing the carboxylic acid group easily change the state of the dispersion and have high aggregation characteristics.

The change in the dispersion state of the polymer particles caused by change in the pH can be adjusted by means of the component ratio of the polymer particle having a carboxylic acid group, such as ester acrylate, or the like, and it can also be adjusted by means of an anionic surfactant which is used as a dispersant.

Desirably, the resin constituting the polymer particles is a polymer that has both of a hydrophilic part and a hydrophobic part. By incorporating a hydrophobic part, the hydrophobic part is oriented toward to the inner side of the polymer particle, and the hydrophilic part is oriented efficiently toward the outer side, thereby having the effect of further increasing the change in the dispersion state caused by change in the pH of the liquid. Therefore, aggregation can be performed more efficiently.

Examples of commercially available resin emulsion include: Joncryl 537 and 7640 (styrene-acrylic resin emulsion, manufactured by Johnson Polymer), Microgel E-1002 and E-5002 (styrene-acrylic resin emulsion, manufactured by Nippon Paint), Voncoat 4001 (acrylic resin emulsion, manufactured by Dainippon Ink and Chemicals), Voncoat 5454 (styrene-acrylic resin emulsion, manufactured by Dainippon Ink and Chemicals), SAE-1014 (styrene-acrylic resin emulsion, manufactured by Zeon Japan), Jurymer ET-410 (acrylic resin emulsion, manufactured by Nihon Junyaku), Aron HD-5 and A-104 (acrylic resin emulsion, manufactured by Toa Gosei), Saibinol SK-200 (acrylic resin emulsion, manufactured by Saiden Chemical Industry), and Zaikthene L (acrylic resin emulsion, manufactured by Sumitomo Seika Chemicals). However, the resin emulsion is not limited to these examples.

The weight ratio of the polymer particles to the pigment is desirably 2:1 through 1:10, and more desirably 1:1 through 1:3. If the weight ratio of the polymer particles to the pigment is less than 2:1, then there is no substantial improvement in the aggregating force of the aggregate formed by the cohesion of the polymer particles. On the other hand, if the weight ratio of the polymer particles to the pigment is greater than 1:10, the viscosity of the ink becomes too high and the ejection characteristics, and the like, deteriorate.

From the viewpoint of the adhesive force after the cohesion, it is desirable that the molecular weight of the polymer particles added to the ink is no less than 5,000. If it is less than 5,000, then beneficial effects are insufficient in terms of improving the internal aggregating force of the ink aggregate, achieving good fixing characteristics after transfer to the recording medium, and improving the image quality.

Desirably, the volume-average particle size of the polymer particles is in the range of 10 nm to 1 μm, more desirably, the range of 10 nm to 500 nm, even desirably 20 nm to 200 nm and particularly desirably, the range of 50 nm to 200 nm. If the particle size is not more than 10 nm, then valuable effects in improving the image quality or enhancing transfer characteristics cannot be expected, even if aggregation occurs. If the particle size is not smaller than 1 μm, then there is a possibility that the ejection characteristics from the ink head or the storage stability will deteriorate. Furthermore, there are no particular restrictions on the volume-average particle size distribution of the polymer particles and they may have a broad volume-average particle size distribution or they may have a monodisperse volume-average particle size distribution.

Moreover, two or more types of polymer particles may be used in combination in the ink.

Examples of the pH adjuster added to the ink in the present embodiment include an organic base and an inorganic alkali base, as a neutralizing agent. In order to improve storage stability of the ink for inkjet recording, the pH adjuster is desirably added in such a manner that the ink for inkjet recording has the pH of 6 through 10.

Inks used in embodiments of the present invention desirably include water soluble organic solvent, in order to prevent blockage of the nozzles of the inkjet head by drying. The water soluble organic solvent includes wetting agent and permeation agent.

Water soluble organic solvent is similar to the case of the treatment liquid, and can include, for example, multivalent alcohols, multivalent alcohol derivatives, solvents containing nitrogen, alcohols, solvents containing sulfur, and so on. Specific examples of multivalent alcohols include ethylene glycol, diethylene glycol, propylene glycol, butylene glycol, triethylene glycol, 1,5-pentane diol, 1,2,6-hexane triol, glycerine, and so on. Specific examples of multivalent alcohol derivatives include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, diglycerine ethylene oxide additives, and so on. Specific examples of solvents containing nitrogen include pyrrolidone, N-methyl-2-pyrrolidone, cyclohexyl pyrrolidone, triethanol amine, and so on. Specific examples of alcohols include ethanol, isopropyl alcohol, butyl alcohol, benzyl alcohol, and other alcohols. Specific examples of solvents containing sulphur include thiodiethanol, thiodiglycerol, sulfolane, dimethyl sulfoxide, and so on. In addition, propylene carbonate, ethylene carbonate, and the like can be used.

Surfactant

The ink according to the present embodiment may contain a surfactant.

Examples of the surfactant in the ink include: in a hydrocarbon system, an anionic surfactant, such as a salt of a fatty acid, an alkyl sulfate ester salt, an alkyl benzene sulfonate salt, an alkyl naphthalene sulfonate salt, a dialkyl sulfosuccinate salt, an alkyl phosphate ester salt, a naphthalene sulfonate/formalin condensate, and a polyoxyethylene alkyl sulfonate ester salt; and a non-ionic surfactant, such as a polyoxyethylene alkyl ether, a polyoxyethylene alkyl aryl ether, a polyoxyethylene fatty acid ester, a sorbitan fatty acid ester, a polyoxyethylene sorbitan fatty acid ester, a polyoxyethylene alkyl amine, a glycerin fatty acid ester, and an oxyethylene oxypropylene block copolymer. Desirable examples of the surfactant further include: Surfynols (manufactured by Air Products & Chemicals), which is an acetylene-based polyoxyethylene oxide surfactant, and an amine oxide type of amphoteric surfactant, such as N,N-dimethyl-N-alkyl amine oxide.

Moreover, it is also possible to use the surfactants cited in Japanese Patent Application Publication No. 59-157636, pages 37 to 38, and Research Disclosure No. 308119 (1989). Furthermore, it is also possible to use a fluoride type (alkyl fluoride type), or silicone type of surfactant such as those described in Japanese Patent Application Publication Nos. 2003-322926, 2004-325707 and 2004-309806. It is also possible to use a surface tension adjuster of this kind as an anti-foaming agent; and a fluoride or silicone compound, or a chelating agent, such as ethylenediamine tetraacetic acid (EDTA), can also be used.

The surfactant contained in the ink has beneficial effects in raising the wettability on the solid or semi-solid aggregating treatment agent layer by reducing the surface tension, and therefore the aggregating action effectively progresses due to the increase in the contact surface area between the solid or semi-solid aggregating treatment agent layer and the ink.

It is desirable in the present embodiment that the ink has the surface tension of 10 mN/m through 50 mN/m. Moreover, from the viewpoint of simultaneously achieving good permeability into the permeable recording medium, formation of fine droplets and good ejection properties, it is more desirable that the ink has the surface tension of 15 mN/m through 45 mN/m.

Desirably, the viscosity of ink in embodiments of the present invention is in the rage from 1.0 cP to 20.0 cP.

Apart from the foregoing, according to requirements, it is also possible that the ink contains a pH buffering agent, an anti-oxidation agent, an antibacterial agent, a viscosity adjusting agent, a conductive agent, an ultraviolet absorbing agent, or the like.

Treatment Liquid

It is desirable in the present embodiment that the treatment liquid (aggregating treatment liquid) has effects of generating aggregation of the pigment and the polymer particles contained in the ink by producing a pH change in the ink when coming into contact with the ink.

Specific examples of the contents of the treatment liquid are: polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furan carboxylic acid, pyridine carboxylic acid, cumaric acid, thiophene carboxylic acid, nicotinic acid, derivatives of these compounds, and salts of these.

A treatment liquid having added thereto a polyvalent metal salt or a polyallylamine is the preferred examples of the treatment liquid. The aforementioned compounds may be used individually or in combinations of two or more thereof.

From the standpoint of aggregation ability with the ink, the treatment liquid desirably has a pH of 1 to 6, more desirably a pH of 2 to 5, and even more desirably a pH of 3 to 5.

The amount of the component that causes aggregation of the pigment and polymer particles of the ink in the treatment liquid is desirably not less than 0.01 wt % and not more than 20 wt % based on the total weight of the liquid. Where the amount of this component is less than 0.01 wt %, sufficient concentration diffusion does not proceed when the treatment liquid and ink come into contact with each other, and sufficient aggregation action caused by pH variation sometimes does not occur. Further, where the amount of this component is more than 20 wt %, the ejection ability from the inkjet head can be degraded.

From the standpoint of preventing the nozzles of inkjet heads from being clogged by the dried treatment liquid, it is preferred that the treatment liquid include an organic solvent capable of dissolving water and other additives. A wetting agent and a penetrating agent are included in the organic solvent capable of dissolving water and other additives.

The solvents can be used individually or in a mixture of plurality thereof together with water and other additives.

The content ratio of the organic solvent capable of dissolving water and other additives is desirably not more than 60 wt % based on the total weight of the treatment liquid. Where this amount is higher than 60 wt %, the viscosity of the treatment liquid increases and ejection ability from the inkjet head can be degraded.

In order to improve fixing ability and abrasive resistance, the treatment liquid may further include a resin component. Any resin component may be employed, provided that the ejection ability from a head is not degraded when the treatment liquid is ejected by an inkjet system and also provided that the treatment liquid will have high stability in storage. Thus, water-soluble resins and resin emulsions can be freely used.

An acrylic resin, a urethane resin, a polyester, a vinyl resin, and a styrene resin can be considered as the resin components. In order to demonstrate a sufficient function of improving the fixing ability, a polymer with a comparatively high molecular weight has to be added at a high concentration of 1 wt % to 20 wt %. However, where such a material is added to and dissolved in a liquid, the viscosity thereof increases and ejection ability is degraded. A latex can be effectively added as an adequate material that can be added to a high concentration, while inhibiting the increase in viscosity. Examples of latex materials include alkyl acrylate copolymers, carboxy-modified SBR (styrene-butadiene latex), SIR (styrene-isoprene) latex, MBR (methyl methacrylate-butadiene latex), and NBR (acrylonitrile-butadiene latex). From the standpoint of the process, the glass transition temperature Tg of the latex has a strong effect during fixing, and is desirably not lower than 40° C. and not higher than 120° C. Furthermore, from the standpoint of the process, the minimum film-formation temperature MFT also has a strong effect during fixing, and in order to obtain sufficient fixing at a low temperature, it is preferred that the MFT be not higher than 100° C., more desirably not higher than 50° C.

The aggregation ability may be further improved by introducing polymer microparticles of reverse polarity with respect to that of the ink into the treatment liquid and causing the aggregation of the pigment contained in the ink with the polymer microparticles.

The aggregation ability may be also improved by introducing a curing agent corresponding to the polymer microparticle component contained in the ink into the treatment liquid, bringing the two liquids into contact, causing aggregation and also crosslinking or polymerization of the resin emulsion in the ink component.

The treatment liquid used in the present embodiment can include a surfactant.

Examples of suitable surfactants of a hydrocarbon system include anionic surfactants such as fatty acid salts, alkylsulfuric acid esters and salts, alkylbenzenesulfonic acid salts, alkylnaphthalenesulfonic acid salts, dialkylsulfosuccinic acid salts, alkylphosphoric acid esters and salts, naphthalenesulfonic acid formalin condensate, and polyoxyethylene alkylsulfuric acid esters and salts, and nonionic surfactants such as polyoxyethylene alkyl ethers, polyoxyethylene alkylallyl ethers, polyoxyethylene fatty acid esters, sorbitan fatty acid esters, polyoxyethylene sorbitan fatty acid esters, polyoxyethylene alkylamines, glycerin fatty acid esters, and oxyethylene oxypropylene block copolymer. It is preferred that SURFYNOLS (made by Air Products & Chemicals), which is an acetylene-type polyoxyethylene oxide surfactant, be used Amineoxide-type amphoteric surfactant such as N,N-dimethyl-N-alkylamineoxide is also a preferred surfactant.

A surfactant described in Japanese Patent Application Publication No. 59-157636, pages 37 to 38 and Research Disclosure No. 308119 (1989) can be also used. Fluorine-containing (fluorinated alkyl system) and silicone-type surfactants such as described in Japanese Patent Application Publication Nos. 2003-322926, 2004-325707, and 2004-309806 can be also used. These surface tension adjusting agents can be also used as an antifoaming agent. Chelating agents represented by fluorine-containing or silicone-type compounds and EDTA can be also used.

These agents are effective in reducing surface tension and increasing wettability on the recording medium. Further, even when the ink is the first to be deposited, effective aggregation action proceeds because of increased wettability of the ink and enlarged contact surface area of the two liquids.

It is desirable in the present embodiment that the treatment liquid has the surface tension of 10 mN/m through 50 mN/m. Moreover, from the viewpoint of simultaneously achieving good permeability into the permeable recording medium, formation of fine droplets and good ejection properties, it is more desirable that the treatment liquid has the surface tension of 15 mN/m through 45 mN/m.

It is desirable in the present embodiment that the treatment liquid has the viscosity of 1.0 mPa·s through 20.0 mPa·s.

Apart from the foregoing, according to requirements, it is also possible that the treatment liquid contains a pH buffering agent, an anti-oxidation agent, an antibacterial agent, a viscosity adjusting agent, a conductive agent, an ultraviolet absorbing agent, or the like.

Modified Embodiments

In the present embodiment as described above, the drum transport method is given as an example of a recording medium transport device. However the recording medium transport device may be a belt transport system, a palette transport system, or the like.

In the embodiment as described above, an inkjet recording apparatus in which ink droplets are directly ejected onto the recording medium to form images is explained (the direct recording system). However, the scope of application of the present invention is not limited to this, and the present invention can also be applied to an intermediate transfer type image forming apparatus in which an image (the primary image) is formed on an intermediate transfer member, and by transferring the image to the recording paper at a transfer unit, the final image is formed. In this case, the intermediate transfer member on which the primary image is recorded can be interpreted to be the "recording medium".

Also, an image processing device that carries out the higher-order color correction process and/or the temperature correction process can be provided. Further, a program for achieving the processing function of the image processing device using a computer can be provided. This program may be recorded on a recording device (ROM or the like) within the image processing device, or may be recorded on an ancillary external device such as a hard disk or the like. Also, the program may be recorded on a recording medium (a so-called external storage medium), such as a CD-ROM or memory card or the like, that can be separated from the apparatus.

As can be understood from the above description of embodiments of the present invention, this specification document discloses many technical concepts that are contained in the present invention as follows.

One aspect of the present invention is directed to an inkjet recording apparatus comprising: a treatment liquid deposition device which deposits a treatment liquid insolubilizing or aggregating inks of a plurality of colors, onto a recording medium; a recording head which has a plurality of nozzles ejecting the inks onto the recording medium on which the treatment liquid has been deposited; a data acquisition device which acquires density data of an image with respect to each color, the density data corresponding to the plurality of colors; a higher-order color correction device which corrects the density data, wherein when the inks of different colors are ejected in ejection order so that a preceding ink ejected precedingly to form a lower layer and a subsequent ink ejected subsequently to form an upper layer overlap each other, the higher-order color correction device corrects the density data for a nozzle ejecting the subsequent ink according to the density data for a nozzle ejecting the preceding ink; and an ejection controller which controls ejection of the inks from the recording head according to the density data that the higher-order color correction device has corrected in such a manner that the image is formed on the recording medium.

Desirably, the higher-order color correction device corrects the density data for the upper layer according to the density data for the lower layer using a prescribed relational expression.

The relational expression may be represented in the form an arithmetic expression, or provided in the form of a conversion table.

Desirably, the higher-order color correction device corrects the density data in such a manner that, as the density of the preceding ink forming the lower layer becomes higher, the density of the subsequent ink forming the upper layer becomes lower.

The higher the density of the preceding ink droplets of a lower layer, the weaker the effect of the treatment liquid with respect to the subsequently ejected ink (upper layer ink), and the dot on the upper layer tends to spread. Therefore, in that case, a correction that modifies the density data in the lighter density direction (weaker density direction) is desirable.

Desirably, the inkjet recording apparatus further comprises a halftoning processor which converts the density data that the higher-order color correction device has corrected, into two-valued or multi-valued dot data for the plurality of nozzles of the recording head, wherein the ejection controller controls the ejection of the inks from the recording head according to the dot data into which the halftoning processor has converted the density data.

Desirably, the higher-order color correction according to an embodiment of the present invention is carried out on the image data prior to input to the halftoning process, and the dot data is generated using the image data after correction.

Desirably, the inkjet recording apparatus further comprises: a temperature information acquisition device which acquires temperature information when the recording head ejects the inks; and a temperature correction device which corrects the density data that the higher-order color correction device has corrected, according to the temperature information, wherein the ejection controller controls the recording head according to the density data which the temperature correction device has corrected.

Desirably, the data after higher-order color correction is further corrected according to temperature.

Desirably, the inkjet recording apparatus further comprises: a test pattern generation device which generates test pattern data according to which the recording head forms a test pattern on the recording medium; a colorimetry device which reads the test pattern on the recording medium formed on the recording medium according to the test pattern data and acquires color information of the test pattern; a temperature information acquisition device which acquires temperature information from the color information according to a relationship among temperature, hue and chroma obtained in advance; and a temperature correction device which corrects the density data which the higher-order color correction device has corrected, according to the temperature information, wherein the ejection controller controls the recording head according to the density data the temperature correction device has corrected.

The temperature information acquisition device is not limited to a temperature sensor or the like that directly measures the temperature. By using the correlation between temperature and reproduced color, it is possible to indirectly obtain the temperature information from the results of color measurement on a test pattern. In other words, "temperature information" can be interpreted to include other information correlated to temperature (for example, color information).

Desirably, the temperature correction device corrects the density data in such a manner that, as the temperature indicated by the temperature information becomes higher, density indicated by the density data becomes higher.

Normally, the higher the temperature, the faster the reaction between the ink and the treatment liquid, and therefore the ejected dots tend to be smaller. Therefore, in order to perform the correction based on this, desirably, the higher the temperature, the more the density data is corrected in the dense direction.

Desirably, the inkjet recording apparatus further comprises: a patch set output device which causes the ejection controller to form a patch set on the recording medium, the patch set including a plurality of density patches formed under different conditions of output color and the density data; and a reader which reads an image of the patch set formed on the recording medium, wherein correction processing by the higher-order color correction device is modified according to the image of the patch set read by the reader.

By checking the correction results, determining whether or not the correction is proper, and modifying the details of the correction if necessary, it is possible to ensure stability of image reproduction.

Desirably, the inkjet recording apparatus further comprises: a patch set output device which causes the ejection controller to form a patch set on the recording medium, the patch set including a plurality of density patches formed under different conditions of output color and the density data; and a reader which reads an image of the patch set formed on the recording medium, wherein correction processing by the temperature correction device is modified according to the image of the patch set read by the reader.

By checking the correction result, and modifying the details of the correction when necessary, it is possible to ensure stability of the image quality of the images output.

Desirably, correction data used for determining an amount of higher-order color correction by the higher-order color correction device is updated with respect to each of types of the inks used, a type of the recording medium used and a type of the treatment liquid used.

It is possible to provide optimum correction data corresponding to combinations of the ink type, recording medium, and treatment liquid, and therefore, it is possible to respond flexibly to new types of ink, and so on.

Desirably, the recording head includes a plurality of ejection heads provided respectively for the plurality of colors which correspond to at least cyan, magenta and yellow.

The present invention is well suited to inkjet recording apparatuses that include at least the three colors C, M, and Y.

Another aspect of the present invention is directed to a color correction method for inkjet recording that ejects inks of a plurality of colors from a plurality of nozzles of a recording head onto a recording medium on which a treatment liquid insolubilizing or aggregating the inks has been deposited so as to form a color image on the recording medium, the color correction method comprising: a data acquisition step of acquiring density data of the image with respect to each color, the density data corresponding to the plurality of colors; a higher-order color correction step of correcting the density data, wherein when the inks of different colors are ejected in ejection order so that a preceding ink ejected precedingly to form a lower layer and a subsequent ink ejected subsequently to form an upper layer overlap each other, the density data for a nozzle ejecting the subsequent ink is corrected according to the density data for a nozzle ejecting the preceding ink; and an ejection control step of controlling ejection of the inks from the recording head according to the density data that has corrected in the higher-order color correction step in such a manner that the image is formed on the recording medium.

It should be understood that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An inkjet recording apparatus comprising:
    a treatment liquid deposition device which deposits a treatment liquid insolubilizing or aggregating inks of a plurality of colors, onto a recording medium;
    a recording head which has a plurality of nozzles ejecting the inks onto the recording medium on which the treatment liquid has been deposited;
    a data acquisition device which acquires density data of an image with respect to each color, the density data corresponding to the plurality of colors;
    a higher-order color correction device which corrects the density data, wherein when the inks of different colors are ejected in ejection order so that a preceding ink ejected precedingly to form a lower layer and a subsequent ink ejected subsequently to form an upper layer overlap each other, the higher-order color correction device corrects the density data for a nozzle ejecting the subsequent ink according to the density data for a nozzle ejecting the preceding ink; and
    an ejection controller which controls ejection of the inks from the recording head according to the density data that the higher-order color correction device has corrected in such a manner that the image is formed on the recording medium.

2. The inkjet recording apparatus as defined in claim 1, wherein the higher-order color correction device corrects the density data for the upper layer according to the density data for the lower layer using a prescribed relational expression.

3. The inkjet recording apparatus as defined in claim 1, wherein the higher-order color correction device corrects the density data in such a manner that, as the density of the preceding ink forming the lower layer becomes higher, the density of the subsequent ink forming the upper layer becomes lower.

4. The inkjet recording apparatus as defined in claim 1, further comprising a halftoning processor which converts the density data that the higher-order color correction device has corrected, into two-valued or multi-valued dot data for the plurality of nozzles of the recording head,
    wherein the ejection controller controls the ejection of the inks from the recording head according to the dot data into which the halftoning processor has converted the density data.

5. The inkjet recording apparatus as defined in claim 1, further comprising:
    a temperature information acquisition device which acquires temperature information when the recording head ejects the inks; and
    a temperature correction device which corrects the density data that the higher-order color correction device has corrected, according to the temperature information,
    wherein the ejection controller controls the recording head according to the density data which the temperature correction device has corrected.

6. The inkjet recording apparatus as defined in claim 5, wherein the temperature correction device corrects the density data in such a manner that, as temperature indicated by the temperature information becomes higher, density indicated by the density data becomes higher.

7. The inkjet recording apparatus as defined in claim 5, further comprising:
    a patch set output device which causes the ejection controller to form a patch set on the recording medium, the patch set including a plurality of density patches formed under different conditions of output color and the density data; and
    a reader which reads an image of the patch set formed on the recording medium,
    wherein correction processing by the temperature correction device is modified according to the image of the patch set read by the reader.

8. The inkjet recording apparatus as defined in claim 1, further comprising:
    a test pattern generation device which generates test pattern data according to which the recording head forms a test pattern on the recording medium;
    a colorimetry device which reads the test pattern formed on the recording medium according to the test pattern data and acquires color information of the test pattern;
    a temperature information acquisition device which acquires temperature information from the color information according to a relationship among temperature, hue and chroma obtained in advance; and
    a temperature correction device which corrects the density data that the higher-order color correction device has corrected, according to the temperature information,
    wherein the ejection controller controls the recording head according to the density data which the temperature correction device has corrected.

9. The inkjet recording apparatus as defined in claim 8, wherein the temperature correction device corrects the density data in such a manner that, as temperature indicated by the temperature information becomes higher, density indicated by the density data becomes higher.

10. The inkjet recording apparatus as defined in claim 8, further comprising:
- a patch set output device which causes the ejection controller to form a patch set on the recording medium, the patch set including a plurality of density patches formed under different conditions of output color and the density data; and
- a reader which reads an image of the patch set formed on the recording medium,
- wherein correction processing by the temperature correction device is modified according to the image of the patch set read by the reader.

11. The inkjet recording apparatus as defined in claim 1, further comprising:
- a patch set output device which causes the ejection controller to form a patch set on the recording medium, the patch set including a plurality of density patches formed under different conditions of output color and the density data; and
- a reader which reads an image of the patch set formed on the recording medium,
- wherein correction processing by the higher-order color correction device is modified according to the image of the patch set read by the reader.

12. The inkjet recording apparatus as defined in claim 11, wherein:
- the patch set output device causes the ejection controller to form the patch set for the preceding ink and the patch set for the subsequent ink, and
- the correction processing by the higher-order color correction device is modified according to inclinations of densities of the patch set for the preceding ink and the patch set for the subsequent ink.

13. The inkjet recording apparatus as defined in claim 1, wherein correction data used for determining an amount of higher-order color correction by the higher-order color correction device is updated with respect to each of types of the inks used, a type of the recording medium used and a type of the treatment liquid used.

14. The inkjet recording apparatus as defined in claim 1, wherein the recording head includes a plurality of ejection heads provided respectively for the plurality of colors which correspond to at least cyan, magenta and yellow.

15. The inkjet recording apparatus as defined in claim 1, further comprising a density unevenness correction device which corrects the density data in such a manner that density unevenness of the image caused by ejection characteristics of the plurality of nozzles, ink ejection positions, non-ejection of the plurality of nozzles is reduced.

* * * * *